US010797602B2

(12) United States Patent
Pastore et al.

(10) Patent No.: US 10,797,602 B2
(45) Date of Patent: Oct. 6, 2020

(54) CONTROLLER WITH VARIABLE SAMPLING GENERATOR

(71) Applicant: Power Integrations, Inc., San Jose, CA (US)

(72) Inventors: Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/535,857

(22) Filed: Aug. 8, 2019

(65) Prior Publication Data
US 2020/0119652 A1  Apr. 16, 2020

Related U.S. Application Data

(63) Continuation of application No. 16/162,091, filed on Oct. 16, 2018, now Pat. No. 10,418,908.

(51) Int. Cl.
*H02M 3/335*  (2006.01)
*H02M 1/42*  (2007.01)
*H02M 1/08*  (2006.01)
*H02M 1/00*  (2006.01)

(52) U.S. Cl.
CPC ......... *H02M 3/33523* (2013.01); *H02M 1/08* (2013.01); *H02M 1/42* (2013.01); *H02M 3/33515* (2013.01); *H02M 2001/0009* (2013.01)

(58) Field of Classification Search
CPC ...... H02M 3/33523; H02M 1/08; H02M 1/42; H02M 3/33515; H02M 2001/0009; H02M 3/33507; H02M 3/335
See application file for complete search history.

(56) References Cited

U.S. PATENT DOCUMENTS 5,731,769 A * 3/1998 Girardeau, Jr. ........ H03M 3/462
341/61
7,551,460 B2 * 6/2009 Lalithambika .... H02M 3/33523
323/286
7,755,917 B2 * 7/2010 Djenguerian ..... H02M 3/33515
363/95

(Continued)

OTHER PUBLICATIONS

Extended European Search Report and Opinion pursuant to Rule 62 EPC for Application No. 19203639.0, dated Feb. 20, 2020, 108 pages.

*Primary Examiner* — Adolf D Berhane
(74) *Attorney, Agent, or Firm* — Pamela Lau Kee

(57) ABSTRACT

A controller for use in a power converter includes a comparator configured to compare a sense signal representative of an amount of energy delivered to an output of the power converter, to a target value. An update clock generator configured to receive the sense signal and to generate a clock signal having a clock frequency in response to the sense signal. A request control coupled to the comparator and to the update clock generator, the request control configured to generate a request signal having a request frequency that is responsive to an output of the comparator and that controls an operational state of a power switch of the power converter. The request control further configured to update a rate at which the request frequency of the request signal is responsive to the clock frequency of the clock signal.

35 Claims, 8 Drawing Sheets

(56) References Cited

U.S. PATENT DOCUMENTS

| | | | | |
|---|---|---|---|---|
| 8,098,503 B2* | 1/2012 | Gaknoki | ................ | H05B 45/37 |
| | | | | 363/21.17 |
| 8,553,439 B2* | 10/2013 | Gaknoki | ........... | H02M 3/33523 |
| | | | | 363/97 |
| 8,717,785 B2* | 5/2014 | Gaknoki | ........... | H02M 3/33507 |
| | | | | 323/283 |
| 8,929,102 B2* | 1/2015 | Zhang | .................. | G11C 27/024 |
| | | | | 341/122 |
| 9,071,152 B2 | 6/2015 | Morong et al. | | |
| 9,136,765 B2* | 9/2015 | Balakrishnan | .... | H02M 3/33523 |
| 9,214,851 B1* | 12/2015 | Mao | ........................ | H05B 45/37 |
| 9,602,013 B2* | 3/2017 | Pastore | ............. | H02M 3/33507 |
| 9,893,630 B2* | 2/2018 | Balakrishnan | .......... | H02M 1/08 |
| 10,033,284 B2* | 7/2018 | Werner | ............... | H02M 1/4258 |
| 10,186,976 B2* | 1/2019 | Duvnjak | ........... | H02M 3/33592 |
| 10,243,442 B1* | 3/2019 | Balakrishnan | .......... | H02M 1/08 |
| 10,284,100 B2* | 5/2019 | Djenguerian | ........... | H02M 1/08 |
| 10,418,908 B1* | 9/2019 | Pastore | ................ | H02M 3/285 |
| 10,574,302 B2* | 2/2020 | Garcia | .................. | H04B 5/0075 |
| 2013/0329462 A1 | 12/2013 | Duvnjak | | |
| 2014/0211510 A1* | 7/2014 | Feldtkeller | .............. | H02M 3/24 |
| | | | | 363/15 |
| 2015/0200599 A1 | 7/2015 | Mao et al. | | |
| 2016/0116925 A1* | 4/2016 | Freeman | ........... | H02M 3/33546 |
| | | | | 307/130 |
| 2016/0134194 A1* | 5/2016 | Mao | .................. | H02M 3/33507 |
| | | | | 363/21.17 |
| 2016/0134197 A1* | 5/2016 | Mao | .................. | H02M 3/33515 |
| | | | | 363/21.13 |
| 2016/0187914 A1* | 6/2016 | Li | .......................... | H02M 1/14 |
| | | | | 323/313 |
| 2018/0102709 A1 | 4/2018 | Hari | | |

* cited by examiner

| STATE (CT/ST) | $f_{REQ}$ | $t_{ON}$ |
|---|---|---|
| 0 | $f_0$ | $t_0$ |
| 1 | $f_1$ | $t_1$ |
| | ..... | |
| $2^{N-1}$ | $f_{2^N-1}$ | $t_{2^N-1}$ |

VCO: f(ST) = $T_{REQ}$ = 1/$f_{REQ}$

FIG. 4A

| STATE (CT/ST) | $f_{REQ}$ | $t_{ON}$ |
|---|---|---|
| 0 | $f_0$ | $t_0$ |
| 1 | | |
| | ..... | |
| $2^{N-1}$ | $f_{2^N-1}$ | $t_{2^N-1}$ |

VCO: f(ST) = $f_{REQ}$ = 1/$T_{REQ}$

FIG. 4B

CONTROLLER WITH VARIABLE SAMPLING GENERATOR

CROSS REFERENCE TO RELATED APPLICATIONS

This application is a continuation of U.S. application Ser. No. 16/162,091, filed Oct. 16, 2018, now pending, which is incorporated in its entirety herein by reference.

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. In operation, a switch is utilized to provide the desired output by varying the duty cycle (typically the ratio of the on-time of the switch to the total switching period), varying the switching frequency, or varying the number of pulses per unit time of the switch in a switched mode power converter.

The switched mode power converter also includes a controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control. In one example, switched mode power converters are used to provide regulated power to light emitting diode (LED) devices.

Properties, such as efficiency, size, weight, and cost are usually taken into account when designing a power converter and controller. Switched mode power converters and controllers may also be designed to meet standards set by regulatory agencies. For example, one consideration for a switched mode power converter is the shape and phase of the input current drawn from the power source relative to the ac input voltage. The wall sockets provide an ac input voltage that has a waveform conforming to standards of magnitude, frequency, and harmonic content. However, the characteristics of the current waveform drawn from the wall socket are determined by the power converter. The shape of the ac input voltage is typically sinusoidal but because a switching power converter presents itself as a non-linear load, the shape of the input current drawn from the power source may become distorted (non-sinusoidal) and/or out of phase with ac input voltage. This results in increased power loss in the power distribution systems.

Correction of the input current waveform to reduce shape and/or phase mismatch with respect to the ac input voltage is referred to as power factor correction (PFC). The power factor may be defined as the ratio of the average power over a cycle to the product of the root mean square (rms) voltage and the rms current. That is, the power factor may represent the ratio of the amount of usable power to the amount of total power delivered to the load. As such, the power factor may have a value between zero and one, with unity power factor being the optimal. If the input current is sinusoidal and perfectly in-phase with the input voltage, which is true for linear loads, the power factor of the power converter is one, and none of the energy delivered to the load is returned to the power source. However, as a power converter distorts the wave shape of the input current and/or introduces a phase shift with respect to the input voltage, the power factor decreases. Several regulatory agencies have set tight standards that typically stipulate for greater power factors and/or lower harmonic content of the input current.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4A is a state table illustrating an example relationship between frequency and on-time of FIG. 3, in accordance with embodiments of the present invention.

FIG. 4B is a state table illustrating another example relationship between frequency and on-time of FIG. 3, in accordance with embodiments of the present invention.

Figure 1A:
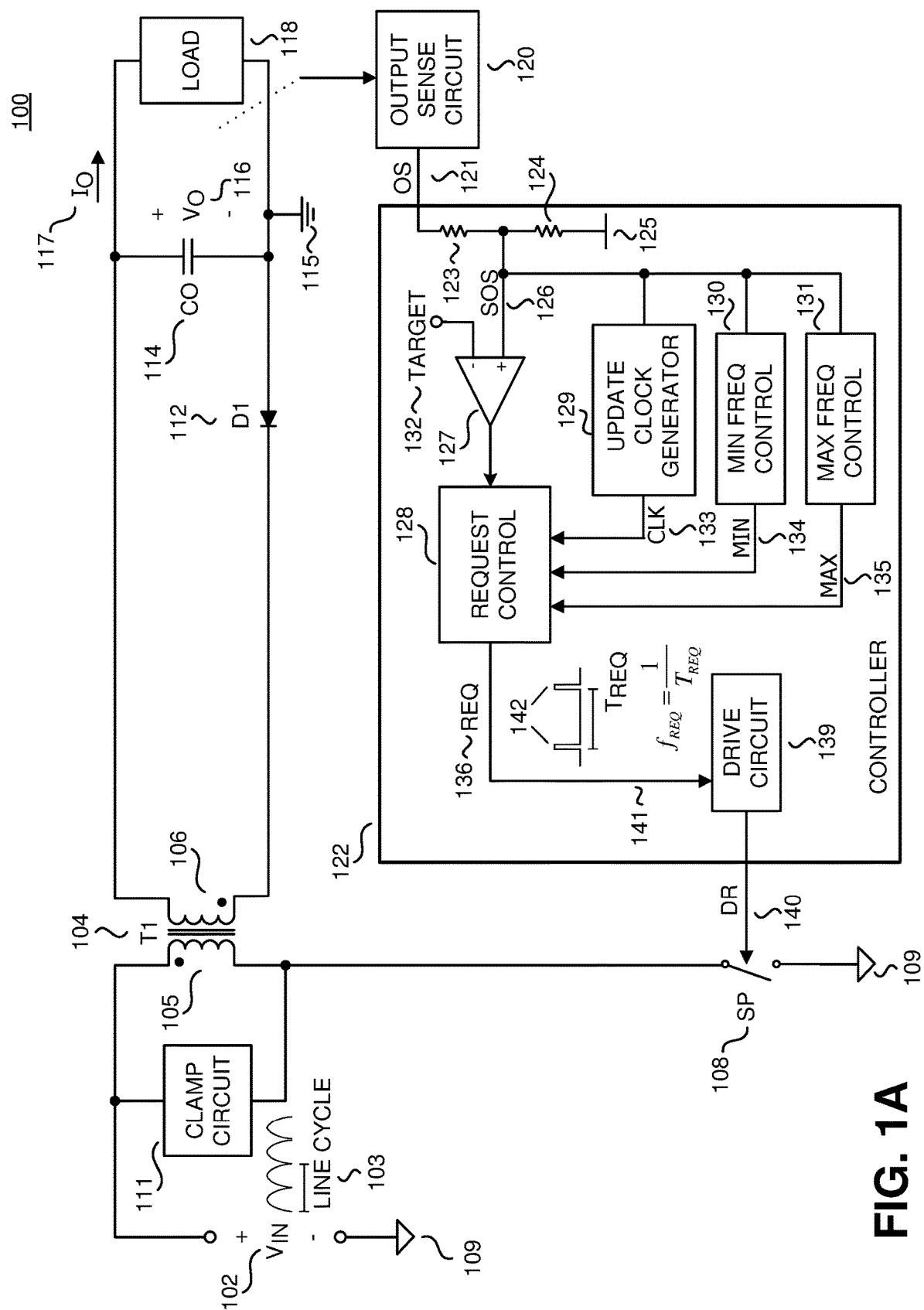
FIG. 1A is a schematic illustrating an example power converter and controller with variable update in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Low power factor and excessive harmonic content causes underutilization of the power infrastructure and also presents other problems such as radiation, excess neutral current, etc. Consequently, regulatory agencies and power utility companies have an incentive to set limits on these parameters. One example application where power converters may be required to perform PFC is power conversion systems that are used in light emitting diode (LED) lighting. The brightness of light provided by LED lamps is generally a function of the current through the LEDs, the power converter used in such a system may also regulate the current provided to the LEDs at the output of the power converter. In other words, the power converter may provide both output regulation and PFC.

Output regulation is typically achieved by a controller for the power converter by sensing the output provided to the LEDs. A feedback signal is used to represent the output of the power converter. The controller controls the transfer of energy from an input to an output of the power converter in response to the feedback signal. Power converters generally respond very quickly to fluctuations in the feedback signal by adjusting the energy transfer to regulate the output at a desired level. However, making rapid changes to the energy transfer can compromise the PFC performance and cause the input current to be non-sinusoidal and/or out of phase with the input voltage, resulting in a reduced power factor.

As will be discussed, examples in accordance with the teachings of the present invention utilize an update clock generator, which may vary how quickly the controller updates its operational state in response to the value of the output of the power converter. In one example, the controller may vary the switching frequency and/or the on-time of a power switch to regulate the output of the power converter. The operational state may refer to the determined switching frequency and/or the on-time for regulation. The controller may determine the operational state in response to the difference between the output of the power converter and a target regulation value.

How quickly the controller changes its operational state may be in response to the frequency of a clock signal outputted by the update clock generator. If the difference between the output of the power converter and a target regulation value is less than a first threshold, the sampling clock generator outputs a clock signal with a first frequency. The first frequency may be selected to be slow enough to regulate the output of the power converter without compromising PFC. However, if the difference between the output of the power converter and a target regulation value is greater than the first threshold, the sampling clock generator outputs a clock signal with a second frequency which is greater (i.e. faster) than the first frequency. In one example, if the difference between the output of the power converter and a target regulation value is greater than the first threshold, this may indicate a transient condition that should be quickly addressed. Under this condition, the controller updates its operational state quickly to addresses the transient condition and bring the power converter back into regulations. In other words, the update clock generator is utilized to update the operational state without compromising PFC. However under transient conditions, the update clock generator updates the operational state quicker than normal conditions to quickly bring the converter back into regulation.

To illustrate, FIG. 1A is a schematic illustrating an example switched mode power converter 100 and controller 122 with an update clock generator 129 in accordance with an embodiment of the disclosure. In one example, the power converter 100 provides output power to the load 118 from an unregulated input voltage $V_{IN}$ 102, which in one example is a rectified ac line voltage or a rectified and filtered ac line voltage. In the depicted example, the input voltage $V_{IN}$ 102 is a full wave rectified voltage having a line cycle 103, which includes two half line cycles of an ac input voltage waveform. In one example, the ac input voltage waveform may be received from a varying ac line, and the power converter 100 is a power factor corrected (PFC) power converter. The input voltage $V_{IN}$ 102 is coupled to the energy transfer element 104. In some embodiments, the energy transfer element 104 may be a coupled inductor, transformer, or an inductor. The example energy transfer element 104 shown in FIG. 1A includes two windings, a primary winding 105 and a secondary winding 106. However, in other examples, the energy transfer element 104 may have more than or less than two windings. Coupled across the primary winding 105 is the clamp circuit 111, which limits the maximum voltage across a power switch SP 108 that is coupled to the primary winding 105 and an input return 109 as shown.

The secondary winding 106 is coupled to the output rectifier D1 112, which in the depicted example is shown as a diode. However, in another example, it is appreciated that the output rectifier D1 112 may be substituted with a transistor used as a synchronous rectifier. An output capacitor CO 114 is shown as being coupled to the output rectifier D1 112 and output return 115. As will be discussed, the power converter 100 further includes a controller 122 to regulate the output of power converter 100. In general, the output of the power converter 100 is an output voltage $V_O$ 116, an output current $I_O$ 117, or a combination of the two. An output sense circuit 120 is coupled to sense the output of the power converter 100 to provide the output sense signal OS 121, also sometimes referred to as a feedback signal. The output sense signal OS 121 may be representative of the energy delivered by the energy transfer element T1 104. The output sense signal OS 121 may be representative of the output voltage $V_O$ 116, an output current $I_O$ 117, or a combination of the two.

In the illustrated example, the power converter 100 is shown as having a flyback topology. It is appreciated that other known topologies and configurations of power converters may also benefit from the teachings of the present disclosure. In the depicted example, the input of power converter 100 is galvanically isolated from the output of power converter 100, such that input return 109 is galvanically isolated from output return 115. Since the input and output of power converter 100 are galvanically isolated, there is no direct current (dc) path across the isolation barrier of energy transfer element T1 104, or between primary winding 105 and secondary winding 106, or between input return 109 and output return 115. However, it should be appreciated that non-isolated converter topologies may benefit from the teachings of the present disclosure.

As shown in the depicted example, power converter 100 includes a controller 122 coupled to receive the output sense signal OS 121. The controller 122 is coupled to generate the drive signal DR 140 in response to the output sense signal OS 121. The drive signal DR 140 controls the turn on and turn off of the power switch SP 108. In one example, the drive signal DR 140 is a rectangular pulse waveform with varying durations of logic high and logic low sections. In one example, a logic high value in the drive signal DR 140 turns on the power switch SP 108 while a logic low value turns off the power switch SP 108. The duration of the logic high section may be referred to as the on-time of the power switch SP 108 while the duration of the logic low sections may be referred to as the off-time of the power switch SP 108. Further, the sum of the on-time and the off- may be referred to as the switching period, which is the inverse of the switching frequency.

To regulate the output provided to the load 118, the controller may vary one or more switching parameters of the power switch SP 108. Example parameters may include the on-time, off-time, and switching frequency/switching period. The various values which the controller 122 may choose for the switching parameters may be referred to as the operational states. In one example, the controller 122 may control the switching frequency and the on-time of power switch SP 108 and the various values for the switching frequency and on-time may be the operational states. As will be further discussed, the controller 122 may increase the switching frequency of the power switch SP 108 to deliver more energy to the load 188. Further, increased switching frequency may correspond with larger on-times for the power switch SP 108.

The controller 122 is shown as including resistors 123 and 124, comparator 127, request control 128, update clock generator 129, minimum frequency control 130, and maximum frequency control 131. Resistors 123 and 124 are coupled together as a voltage divider for the received output sense signal OS 121 and referenced to return 125. As will be further discussed, return 125 may be the input return 109, output return 115, or another value. The divided value of output sense signal OS 121 is shown as scaled output sense signal SOS 126. Comparator is coupled to receive the output sense signal SOS 126 and target value 132. As shown, the scaled output sense signal SOS 126 is received at the non-inverting input of comparator 127 while the target value 132 is received at the inverting input. In one example, the target value 132 is a constant that is representative of a target output value for the output of the power converter 100. In another example, target value 132 may be variable. For example, the target output value for the output voltage of the power converter 100 may be programmable and as such the target value 132 is variable.

Request control 128 is coupled to receive the output of comparator 127 and outputs the request signal REQ 136. The request signal REQ 136 may include request events 142 that are generated in response to the comparison of the scaled output sense signal SOS 126 to the target value 132 and indicates that the controller 122 should turn on the power switch SP 108. The request signal REQ 142 may be a rectangular pulse waveform which pulses to a logic high value and quickly returns to a logic low value. The logic high pulses may be referred to as request events 142. The time between leading edges of the request events 142 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 142 may be responsive to the output sense signal OS 121 (via the comparison of the scaled output sense signal SOS 126 to the target value 132). In one example, the request frequency $f_{REQ}$ increases if the scaled output sense signal SOS 126 is less than the target value 132 and decreases if the scaled output sense signal SOS 126 is greater than the target value 132. As will be further discussed, the speed at which the request control 128 updates the request frequency $f_{REQ}$ of the request signal REQ 136 in response to the output sense signal OS 121 is responsive to a clock frequency $f_{CLK}$ of a clock signal CLK 133 generated by the update clock generator 129. The update clock generator 129 determines the clock frequency $f_{CLK}$ of the clock signal CLK 133 in response to the output sense signal OS 121.

Drive circuit 139 is coupled to receive the request signal REQ 136 through a communication link 141. In the example shown, the drive circuit 139 is coupled to turn on the power switch SP 108 in response to the request events 142. In particular, the drive circuit 139 is coupled to generate the drive signal DR 140 in response to the request events 142 in the request signal REQ 136, which is coupled to control switching of the power switch SP 108 to control the transfer of energy from an input to an output of the power converter. For example, the drive circuit 139 may transition the drive signal DR 140 to a logic high value (to turn on power switch SP 108) in response to a received enable event 142.

It is generally understood that a switch that is closed may conduct current and is considered on, while a switch that is open cannot conduct current and is considered off. In one example, the power switch SP 108 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). The frequency of the request events 142 (i.e., $f_{REQ}$) sets the switching frequency of the power switch SP 108. Further, the request frequency $f_{REQ}$ may determine the on-time of the power switch SP 108. The drive circuit 139 may include a frequency to on-time converter to translate the request frequency $f_{REQ}$ to an on-time for the power switch SP 108.

Update clock generator 129, minimum frequency control 130, and maximum frequency control 131 are coupled to receive the scaled output sense signal SOS 126. The update clock generator 129 outputs the clock signal CLK 133 in response to the output signal OS 121 (via the scaled output sense signal SOS 126). The clock signal CLK 133 may be a rectangular pulse waveform, which pulses to a logic high value and quickly returns to a logic low value. Update clock generator 129 varies the frequency of the clock signal CLK 133 in response to the value of the scaled output sense signal SOS 126. As will be discussed, if the scaled output sense signal SOS 126 is less than an upper fast update reference but greater than a lower fast update reference, the update clock generator 129 outputs a clock signal CLK 133 with a first clock frequency $f_1$, or $f_{CLK}=f_1$. The first clock frequency $f_1$ may be selected to be slow enough to regulate the output of the power converter 100 without compromising PFC. In one example, the first clock frequency $f_1$ may be substantially equal to 10 kilohertz (kHz). However, if the scaled output sense signal SOS is greater than an upper fast update reference or less than a lower fast update reference (also referred to as a fast update reference), the update clock generator 129 outputs the clock signal CLK 133 with a second clock frequency $f_2$ ($f_{CLK}=f_2$) which is greater (i.e., faster) than the first clock frequency $f_1$. In one example, the second clock frequency $f_2$ is M times greater than the first clock frequency $f_1$, or mathematically: $f_2=M*f_1$. For example, the second clock frequency $f_2$ may be five times greater than the first clock frequency $f_1$. Further, the second clock frequency $f_2$ may be substantially equal to 50 kHz.

The update clock generator 129 may increase the frequency of the clock signal CLK 133 to address transient conditions, such as a change in the input voltage $V_{IN}$ 102 or the load 108. If the scaled output sense signal SOS 126 is greater or less than the target value 132 by the first threshold (i.e., fast update reference), this may indicate there is a transient condition that the controller 122 should address. In other words, the power converter 100 may be delivering energy above or below the expected value. During this quick response mode, PFC may be compromised but the controller 122 may bring the output back into regulation quicker.

The request control 128 receives the clock signal CLK 133 and updates/determines the operational state of the power switch SP 108 in response to the output sense signal OS 121 (via comparator 127) at a speed determined by the frequency of the clock signal CLK 133. In other words, the request control 128 receives the clock signal CLK 133 and determines the request frequency $f_{REQ}$ and period $T_{REQ}$ of the request signal REQ 136 in response to the output sense signal OS 121 (via comparator 127) at a speed determined by the frequency of the clock signal CLK 133. As discussed above, the request frequency $f_{REQ}$ and period $T_{REQ}$ of the request signal REQ 136 may set the switching frequency/period and the on-time of the power switch SP 108. For example, if the frequency of the clock signal CLK 133 is 10 kHz, the request control 128 would respond to the output of comparator 127 every 100 microseconds (μs) to determine the request frequency $f_{REQ}$ and period $T_{REQ}$ of the request signal REQ 136.

Minimum frequency control 130 outputs the minimum frequency signal MIN 134 in response to the output signal OS 121 (via the scaled output sense signal SOS 126). The minimum frequency signal MIN 134 may be a rectangular waveform with varying durations of logic high and logic low sections. The minimum frequency control 130 indicates to the request control 128 via the minimum frequency signal MIN 132 a minimum switching frequency that the request control 128 and the controller 122 should be operating. If the scaled output sense signal SOS 126 is greater a minimum frequency reference, this may be an indication that the power converter 100 is over delivering energy to the point that the controller 122 should take swift action to reduce the energy delivered. In operation, if the scaled output sense signal SOS 126 is greater than the minimum frequency reference, the minimum frequency control 130 asserts the minimum frequency signal MIN 134. In one example, a logic high value for the minimum frequency signal MIN 134 may correspond to an asserted minimum frequency signal MIN 134. The request control 128 is coupled to receive the minimum frequency signal MIN 134. In response to an asserted minimum frequency signal MIN 134, the request control 128 outputs the request signal REQ 136 where the request frequency $f_{REQ}$ of the request signal REQ 136 is at a minimum switching frequency value set by the controller 122 (i.e., the request period $T_{REQ}$ is at a maximum value). As such, the switching frequency of the power switch SP 108 is set to a minimum value and energy delivered by the power converter 100 is reduced.

Similarly, maximum frequency control 131 outputs the maximum frequency signal MAX 135 in response to the output signal OS 121 (via the scaled output sense signal SOS 126). The maximum frequency signal MAX 135 may be a rectangular waveform with varying durations of logic high and logic low sections. The maximum frequency control 131 indicates to the request control 128 via the maximum frequency signal MAX 135 a maximum switching frequency that the request control 128 and the controller 122 should be operating. If the scaled output sense signal SOS 126 is less than a maximum frequency reference, this may be an indication that the power converter 100 is under delivering energy to the point that the controller 122 should take swift action to increase the energy delivery. In operation, if the scaled output sense signal SOS 126 is less than a maximum frequency reference, the maximum frequency control 131 asserts the maximum frequency signal MAX 135. In one example, a logic high value may correspond to an asserted maximum frequency signal MAX 135. The request control 128 is coupled to receive the maximum frequency signal MAX 135. In response to an asserted maximum frequency signal MAX 135, the request control 128 outputs the request signal REQ 136 where the request frequency $f_{REQ}$ of the request signal REQ 136 is at a maximum switching frequency value set by the controller 122 (i.e., the request period $T_{REQ}$ is at a minimum value). As such, the switching frequency of the power switch SP 108 is set to a maximum value and energy delivered by the power converter 100 is increased.

Controller 122 may be implemented as a monolithic integrated circuit or may be implemented with discrete electrical components or a combination of discrete and integrated components. Controller 122 and the power switch SP 108 could form part of an integrated circuit that is manufactured as either a hybrid or monolithic integrated circuit. In one example, the entire controller 122 may be referenced to the primary return (and return 125 may be equal to the input return 109) and the output sense circuit 120 may provide the galvanic isolation between the controller 122 and the secondary side of the power converter. Examples of the output sense circuit 120 could include an optocoupler or a secondary side bias winding of the energy transfer element T1 104. However, as will be shown in FIG. 1B, some components of controller 122 may be referenced to the input return 109 while other components of controller 122 may be referenced to the output return 115. For that example, galvanic isolation may be provided by communication link 141.

Figure 1B:
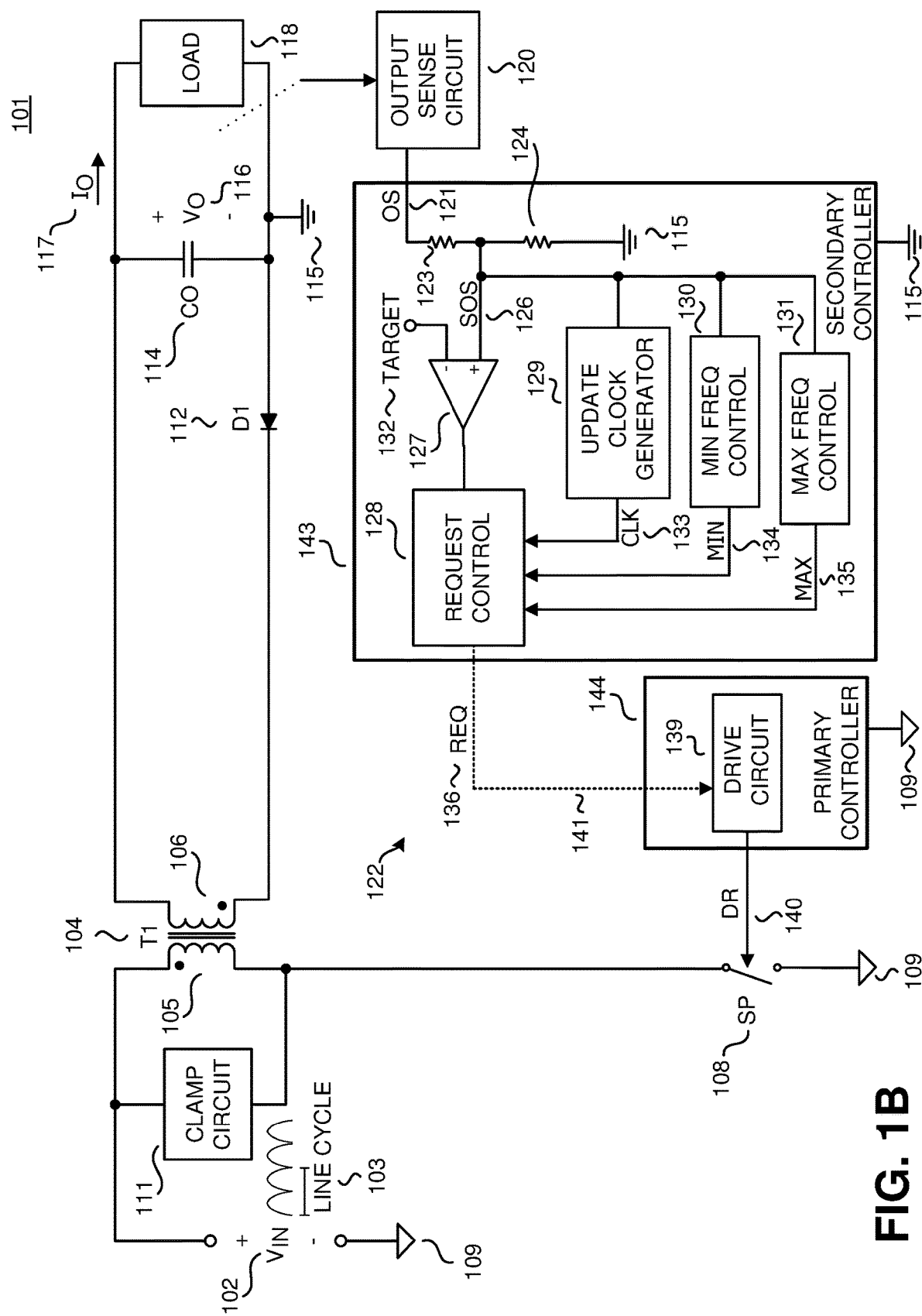
FIG. 1B is a schematic illustrating an example power converter and a primary controller and a secondary controller with variable update in accordance with embodiments of the present invention.

FIG. 1B illustrates another example switched mode power converter 101 that utilizes a controller with an update clock generator in accordance with the teachings of the present disclosure. The power converter 101 example shown in FIG. 1B shares many of the same elements as the example power converter 100 illustrated in FIG. 1A, and it should be understood that similarly named and numbered elements are coupled and function as discussed above. At least one difference, however, is that the controller 122 of power converter 101 includes a primary controller 144 and a secondary controller 143. The primary controller 144 includes the drive circuit 139 and is referenced to the input return 109. Primary controller 144 controls the switching of the power switch SP 108 via the drive signal DR 140. The primary controller 144 and the secondary controller 143 may communicate via communication link 141. In one example, the primary controller 144 and the secondary controller 143 are galvanically isolated from one another, and the communication link 141 provides galvanic isolation using an inductive coupling, such as a transformer or a coupled inductor, an optocoupler, capacitive coupling, or other device that maintains the galvanic isolation.

As shown, the secondary controller 143 outputs the request signal REQ 136 to the primary controller 144 and is referenced to the output return 115. In the example shown, the secondary controller 143 includes the resistors 123 and 124, comparator 127, request control 128, update clock generator 129, minimum frequency control 130 and maximum frequency control 131. The voltage divider formed by resistors 123 and 124 are referenced to output return 115. In another example, the power converter 101 could utilize a synchronous rectifier (such as a transistor) for output rectifier D1 112. For that case, the secondary controller 143 could also output a secondary drive signal to control the synchronous rectifier.

In one example, primary controller 144 and secondary controller 143 may be formed as part of an integrated circuit that is manufactured as either a hybrid or monolithic integrated circuit. In one example, the power switch SP 108 may also be integrated in a single integrated circuit package with the primary controller 144 and the secondary controller 143. In addition, in one example, primary controller 144 and secondary controller 143 may be formed as separate integrated circuits. The power switch SP 108 may also be integrated in the same integrated circuit as the primary controller 144 or could be formed on its own integrated circuit. Further, it should be appreciated that both the primary controller 144, the secondary controller 143, and power switch SP 108 need not be included in a single package and may be implemented in separate controller packages or a combination of combined/separate packages.

Figure 2:
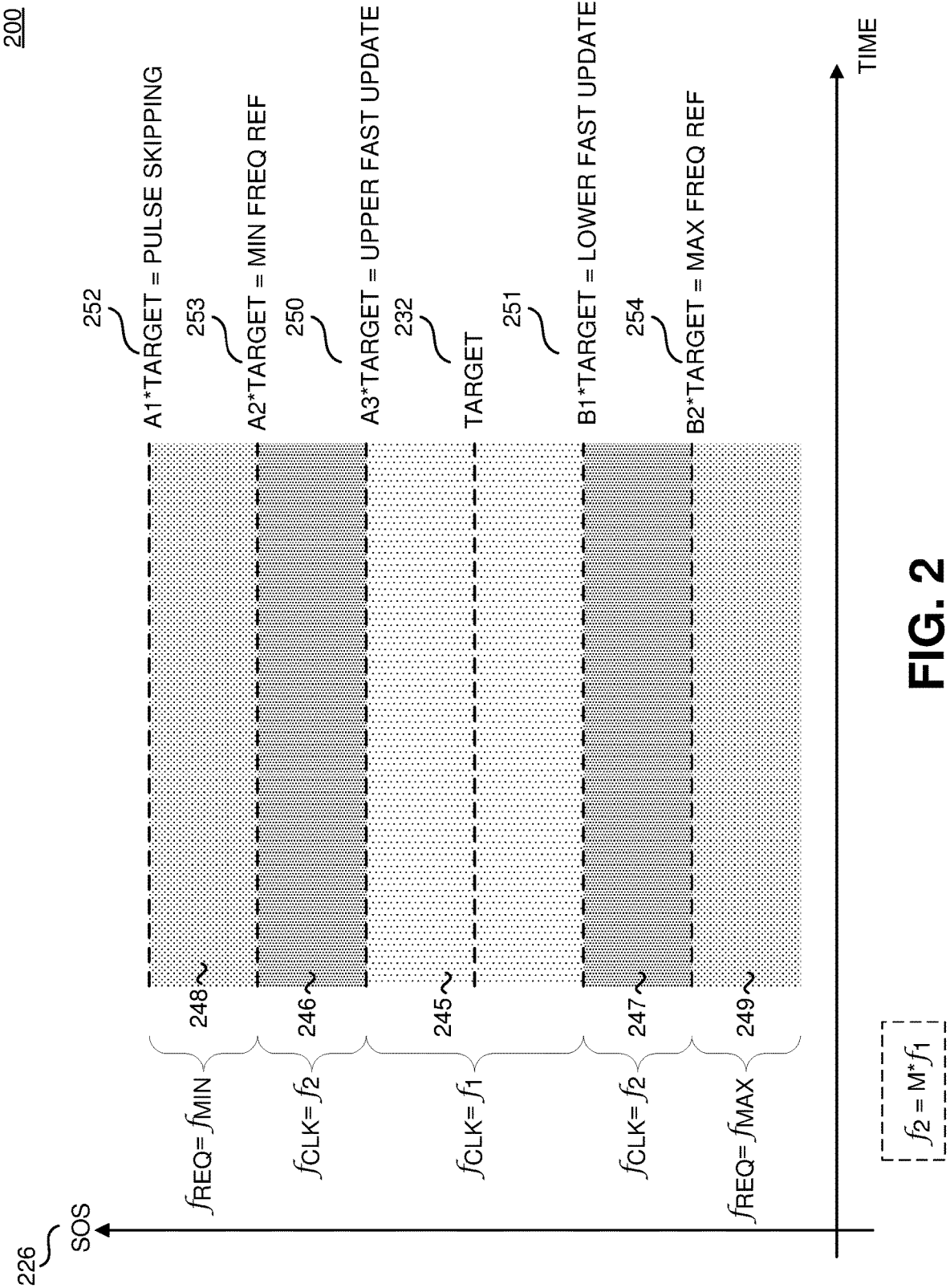
FIG. 2 is a timing diagram illustrating various operation bands for the update of the controller of FIGS. 1A-1B, in accordance with embodiments of the present invention.

FIG. 2 illustrates a timing diagram 200 of various operation bands for the update clock generator 129, minimum frequency control 130, and maximum frequency control 131 shown in FIGS. 1A-1B. It should be appreciated that similar named and numbered elements are coupled and function as described above. As shown, region 245, which is the area shaded with loosely packed dots in FIG. 2, is representative of the normal frequency operating region of the controller and power converter. Within region 245, the controller regulates the output of the power converter while maintaining PFC. Region 245 is banded by the upper fast update reference 250 and the lower fast update reference 251 with the target value 232 between the references. The upper fast update reference 250 may be substantially equal to the product of constant A3 and target value 232. In one example, constant A3 may be a value between 1 and 2, more specifically between 1 and 1.2. In other words, the upper fast update reference 250 is some percentage between 0-100% greater than the target value 232, and more specifically between 0-20% greater. The lower fast update reference 251 may be substantially equal to the product of constant B1 and target value 232. In one example, constant B1 may be a value between 0 and 1, and more specifically between 0.35 and 1. In other words, the lower fast update reference 251 is some percentage between 0-100% of the target value 251, and more specifically 35-100% of the target value 232. In other words, the lower fast update reference 251 is 0-65% less than the target value 232. In one example, the constants A3 and B1 may be trimmable by a user/designer. Further, the constants A3 and B1 may be selected in response to the expected output voltage $V_O$ of the power converter. In other words, constants A3 and B1 may be selected in response to the expected load voltage. The parameters A3 and B1 are selected based on the wanted transient response of the controller. The tighter the values of A3 and B1 (i.e., the closer in magnitude to target value 232), the quicker the transient response. However, the value of the output capacitor could be larger.

If the value for the scaled output sense signal SOS 226 is between the lower fast update reference 251 and the upper fast update reference 250, the frequency of the clock signal CLK outputted by the update clock generator is set to the first clock frequency $f_1$, $f_{CLK}=f_1$. The first clock frequency $f_1$, may be selected to be a speed at which the power converter may regulate its output without adversely affecting PFC. In one example, the first clock frequency $f_1$ may be selected within a range of 1 kHz-10 kHz, and more specifically may be 10 kHz. In other words, if the output sense signal SOS 226 is within a percentage range of target value 232 determined by constants A3 and B1, the clock frequency $f_{CLK}$ is substantially equal to the first clock frequency $f_1$.

Regions 246 and 247, which are shaded with densely packed dots in FIG. 2, are representative of regions of faster frequency switching. These regions correspond to transient conditions that affect the output of the power converter. As such, the controller increases how quickly it responds to the output to try to bring the power converter back into regulation faster than in region 245. Region 246 is banded by the upper fast update reference 250 and the minimum frequency reference 253 while region 247 is banded by the lower fast update reference 251 and the maximum frequency reference 254. The minimum frequency reference 253 is substantially equal to the product of constant A2 and target value 232. The constant A2 may be a value between 1 and 2, and more specifically between 1.15 and 1.4. Further, the constant A2 is greater than constant A3 (i.e., A3<A2). In other words, the minimum frequency reference 253 is some percentage between 0-100% greater than the target value 232, and more specifically between 15-40% greater. The maximum frequency reference 254 is substantially equal to the product of constant B2 and the target value 232. Constant B2 may be a value between 0 and 1, and more specifically between 0.2 and 0.85. Further, constant B2 is less than B1 (i.e., B1<B2). In other words, maximum frequency reference 254 may be 15-80% less than the target value 232.

If the scaled output sense signal SOS 226 is between the upper fast reference 250 and the minimum frequency reference 253, or is between the maximum frequency reference 254 and the lower fast update reference 251, the frequency of the clock signal CLK outputted by the update clock generator is set to the second clock frequency $f_2$, or $f_{CLK}=f_2$. The second clock frequency $f_2$ is greater (i.e., faster) than the first clock frequency $f_1$. In one example, the second clock frequency $f_2$ is M times greater than the first clock frequency $f_1$, or mathematically: $f_2=M*f_1$. For example, the second clock frequency $f_2$ may be five times greater than the first clock frequency $f_1$. Further, the second clock frequency $f_2$ may within 20 kHz-50 kHz, and more specifically, substantially 50 kHz. In other words, if the output sense signal SOS 226 is greater than a percentage of target value 232 determined by constant A3 but less than a percentage of target value 232 determined by constant A2, the clock frequency fax is substantially equal to the second clock frequency $f_2$. Constants A2 and A3 may be trimmable values set by a user or designer. Further, they may be selected in response to the expected output voltage of the power converter or the expected load voltage. If the output sense signal SOS 226 is greater than a percentage of target value 232 determined by constant B2 but less than a percentage of target value 232 determined by constant B1, the clock frequency fax is substantially the second clock frequency $f_2$.

Region 248, which is shaded with moderately packed dots in FIG. 2, is representative of a region of minimum frequency switching. Region 248 is banded by a pulse skipping reference 252 and the minimum frequency reference 253. The minimum frequency reference 253 is substantially equal to the product of constant A2 and target value 232. The pulse skipping reference 252 is substantially equal to the product of constant A1 and target value 232. Constant A1 may be a value between 1 and 2, and more specifically between 1.2 and 1.5. Further, the constant A1 is greater than constant A2, which is greater than constant A3 (i.e., A3<A2<A1). In other words, pulse skipping reference 252 may be 20-50% greater than the target value 232.

If the scaled output sense signal SOS 226 is between the minimum frequency reference 253 and the pulse skipping reference 252, the minimum frequency signal MIN outputted by the minimum frequency control is asserted and the controller operates at minimum switching frequency. Or in other words, the frequency of the request signal REQ is set to the minimum switching frequency of the power converter and controller, $f_{REQ}=N_{IN}$. Worded differently, if the output sense signal SOS 226 is greater than a percentage of target value 232 determined by constant A2 but less than a percentage of target value 232 determined by constant A1, the request frequency $f_{REQ}$ is substantially the minimum switching frequency $f_{MIN}$. Further, if the output sense signal SOS 226 is greater than a percentage of target value 232 determined by constant A1, the controller implements pulse skipping.

Region 249, which is shaded by moderately packed dots in FIG. 2, is representative of a region of maximum frequency switching. Region 249 is upper banded by the maximum frequency reference 254. If the scaled output sense signal SOS 226 is less than the maximum frequency reference 254, the maximum frequency signal MAX outputted by the maximum frequency control is asserted and the controller operates at maximum switching frequency. Or in other words, the request frequency $f_{REQ}$ of the request signal REQ is set to the maximum switching frequency of the power converter and controller, $f_{REQ}=f_{MAX}$. In other words, if the scaled output sense signal SOS 226 is less than a percentage of target value 232 determined by constant B2, the request frequency $f_{REQ}$ is substantially equal to the maximum switching frequency $f_{MAX}$.

Figure 3:
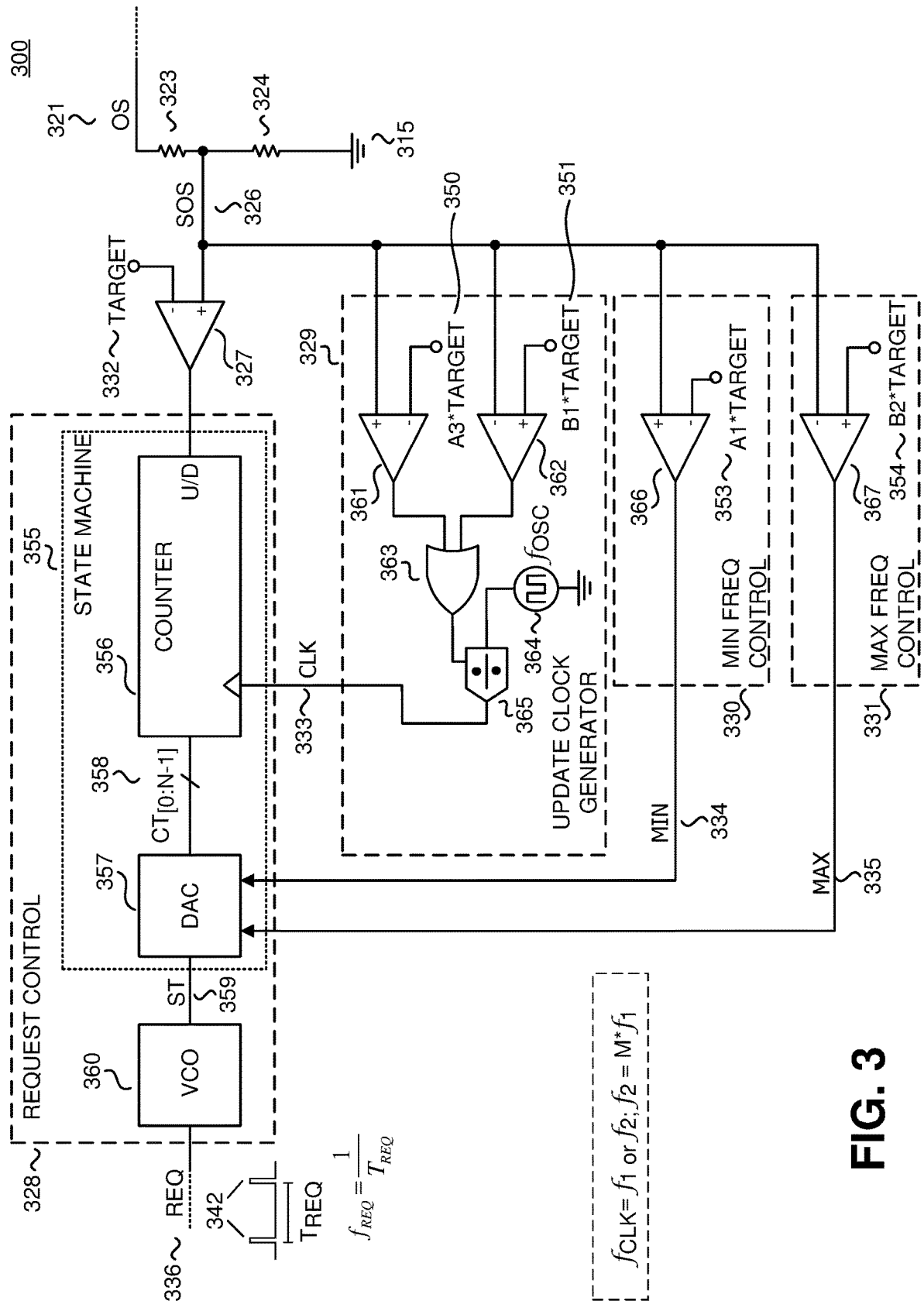
FIG. 3 is a schematic illustrating an example controller of FIG. 1A, in accordance with embodiments of the present invention.

FIG. 3 illustrates elements of an example controller 300. It should be appreciated that the controller 300 shown may be one example of the secondary controller shown in FIG. 1B or one example of a portion of the controller shown in FIG. 1A. Specifically, FIG. 3 illustrates example implementations of the request control 328, update clock generator 329, minimum frequency control 330, and maximum frequency control 331. It should be appreciated that similarly named and numbered elements are coupled and function as described above.

Resistors 323 and 324 are coupled together as a voltage divider for the output sense signal OS 321. As shown, the resistors 323 and 324 are referenced to output return 315, however it should be appreciated they can be referenced to another value. Resistors 323 and 324 produce the scaled output sense signal SOS 326. Comparator 327 is coupled to receive the scaled output sense signal SOS 326 and the target value 332. In one example, comparator 327 receives the target value 332 at its inverting input and the scaled output sense signal SOS 326 at its non-inverting input, which in another example may be reversed.

Request control 328 is shown as including a state machine 355 and voltage controlled oscillator (VCO) 360. State machine 355 is coupled to receive the output of comparator 327 and the clock signal CLK 333 from the update clock generator 329. As shown, the state machine also receives the minimum signal MIN 334 and the maximum signal MAX 335. The state machine 355 outputs the state signal ST 359, which is representative of an operating state of the power converter and more specifically, an operating state of the power switch. In one example, the state signal ST 359 is representative of the switching frequency and/or on-time of the power switch. State signal ST 359 may be an analog signal representative of a digital value. The state machine updates the state signal ST 359 in response to the output of the comparator 327. The speed at which the state machine 355 updates is responsive to the frequency of the clock signal CLK 333. In response to an asserted minimum signal MIN 334, the state machine 355 would output a value for the state signal ST 359 to correspond to the minimum switching frequency. In response to an asserted maximum signal MAX 335, the state machine 355 would output a value for the state signal ST 359 to correspond to the maximum switching frequency.

State machine 355 is shown as including a counter 356 and digital-to-analog converter (DAC) 357. Counter 356 is coupled to receive the output of comparator 327 at its U/D input and the clock signal CLK 333 at its clock input. The counter 356 outputs a count signal CT 358, which may be an N-bit digital signal. In operation, the counter 356 updates its internal count in response to the output of comparator 327 at a speed indicated by the clock signal CLK 333. In one example, the counter 356 counts up when the scaled output sense signal SOS 326 is greater than the target value 332 and counts down when the scaled output sense signal SOS 326 is less than the target value 332. Alternatively, the counter 356 may count up when the scaled output sense signal SOS 326 is less than the target value 332 and counts down when it's greater than the target value 332. The count signal CT 358 may be the internal count of the counter 356.

DAC 357 is coupled to receive the count signal CT 358 and outputs the state signal ST 359. The DAC 356 further receives the minimum signal MIN 334 and the maximum signal MAX 335. In operation, the DAC 357 determines the value for the state signal ST 359 from the received digital count signal CT 358. In one example, the state signal ST 359 may be a voltage signal and the greater the count signal CT 358, the greater the voltage of the state signal ST 359. When the DAC 357 receives an asserted minimum signal MIN 334, the DAC 357 outputs a value for the state signal ST 359 that corresponds to the minimum switching frequency of the power switch (i.e., slowest switching frequency $f_{REQ}$). When the DAC 357 receives an asserted maximum signal MAX 335, the DAC 357 outputs a value for the state signal ST 359 that corresponds to the maximum switching frequency of the power switch (i.e., the fastest switching frequency $f_{REQ}$). In other words, when either minimum signal MIN 334 or the maximum signal MAX 335, the DAC 357 ignores the count signal CT 358. Once either the minimum signal MIN 334 or the maximum signal MAX 335 is deasserted, the DAC 357 returns to determining the value of the state signal ST 359 in response to the count signal CT 358.

The count signal CT 358 (i.e., internal count of the counter 358) and the state signal ST 359 are representative of an operating condition of the power switch. In one example, they may be representative of switching frequency (i.e., the request frequency $f_{REQ}$ of the request signal 336) and the on-time of the power switch. As will be discussed further with FIGS. 4A-4B, an increasing count signal CT 358 and state signal ST 359 may correspond to increasing switching frequency/request frequency $f_{REQ}$. In another example, a decreasing count signal CT 358 and state signal ST 359 may correspond to increasing switching frequency/request frequency $f_{REQ}$.

The VCO 360 is coupled to receive the state signal ST 359 and outputs the request signal REQ 336. In one example, the request signal REQ 336 may be a rectangular pulse waveform that pulses to a logic high value and quickly returns to a logic low value. The logic high pulses may be referred to as request events 342. The time between leading edges of the request events 342 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 342 may be responsive to the value of the state signal ST 359. In one example, an increasing value of the state signal ST 359 may correspond to a decreasing request frequency $f_{REQ}$ (and ergo an increasing request period $T_{REQ}$) as shown in FIG. 4A. In another example, an increasing value of the state signal ST 359 may correspond to an increasing request frequency $f_{REQ}$ (and ergo a decreasing increasing request period $T_{REQ}$) as shown in FIG. 4B.

The update clock generator 329 includes comparators 361 and 362, OR gate 363, oscillator 364 with frequency $f_{OSC}$, and clock divider 365. Comparator 361 is coupled to receive the scaled output sense signal SOS 326 and the upper fast update reference 350 (i.e., product of constant A3 and target value 332). As shown, comparator 361 receives the scaled output sense signal SOS 326 at its non-inverting input and the upper fast update reference 350 at its inverting input. Comparator 362 is coupled to receive the scaled output sense signal SOS 326 and the lower fast update reference 351 (i.e., the product of constant B1 and target value 332). As shown, comparator 362 receives the scaled output sense signal SOS 326 at its inverting input and the lower fast update reference 351 at its non-inverting input. OR gate 363 is coupled to receive the outputs of comparators 361 and 362. Oscillator 364 generates a sequence of pulses with frequency $f_{OSC}$. In one example, the frequency $f_{OSC}$ of the oscillator is substantially equal to 100 kHz, i.e., $f_{OSC}$=100 kHz. Clock divider 365 is shown as receiving the output of the oscillator 364 and the output of the OR gate 363. The clock divider 365 divides the oscillator frequency $f_{OSC}$ by constant X or Y in response to the output of the OR gate 363. In one example, constant X may be 2 times constant Y, i.e., X=2Y. The output of the clock divider 365 is the clock signal CLK 333. In other words, the clock signal CLK 333 has a frequency that is a quotient of the oscillator frequency $f_{OSC}$ and either constant X or Y. The amount at which the oscillator frequency $f_{OSC}$ is divided may be determined by the value of the scaled output sense signal SOS 326 via comparators 361 and 362.

In operation, the clock divider 365 divides the oscillator frequency $f_{OSC}$ by constant X if the output of OR gate 363 is logic low, corresponding to the value of the scaled output sense signal SOS 326 being between the lower fast update reference 351 and the upper fast update reference 350. In other words, the clock divider 365 divides the oscillator frequency $f_{OSC}$ such that the frequency $f_{CLK}$ of the clock signal CLK 333 is substantially equal to the first clock frequency $f_1$. Clock divider 365 divides the oscillator frequency $f_{OSC}$ by constant Y if the output of OR gate 363 is logic high, corresponding to the value of the scaled output sense signal SOS 326 being greater than the upper fast update reference 350 or less than the lower fast update reference 351. In other words, the clock divider 365 divides the oscillator frequency $f_{OSC}$ such that the frequency fax of the clock signal CLK 333 is substantially equal to the second clock frequency $f_2$. For the example of a first clock frequency $f_1$ substantially equal to 5 kHz, a second clock frequency $f_2$ substantially equal to 10 kHz and an oscillating frequency $f_{OSC}$ substantially equal to 100 kHz, the clock divider 365 divides the oscillator frequency $f_{OSC}$ by 20 (X) when the output of OR gate is logic low (i.e., the value of the scaled output sense signal SOS 326 is between the lower fast update reference 351 and the upper fast update reference 350) and the clock diver 365 divides the oscillator frequency $f_{OSC}$ by 10 (Y) when the output of OR gate is logic high (i.e., the value of the scaled output sense signal SOS 326 is greater than the upper fast update reference 350 or less than the lower fast update reference 351).

Minimum frequency control 330 includes a comparator 366 which is coupled to receive the scaled output sense signal 326 and the minimum frequency reference 353 (i.e. the product of constant A1 and target value 332) and outputs the minimum frequency signal MIN 334. As shown, the comparator 366 receives the scaled output sense signal SOS 326 at its non-inverting input and the minimum frequency reference 353 at its inverting input. In operation, the minimum frequency signal MIN 334 is asserted (i.e. logic high) when the scaled output sense signal SOS 326 is greater than the minimum frequency reference 353. When the minimum frequency signal MIN 334 is asserted, the request control 328 outputs a request signal REQ 336 with a request frequency substantially equal to the minimum switching frequency $f_{MIN}$ of the power switch.

Maximum frequency control 331 includes a comparator 367 that is coupled to receive the scaled output sense signal 326 and the maximum frequency reference 354 (i.e., the product of constant B2 and target value 332) and outputs the maximum frequency signal MAX 335. As shown, the comparator 367 receives the scaled output sense signal SOS 326 at its inverting input and the maximum frequency reference 354 at its non-inverting input. In operation, the maximum frequency signal MAX 335 is asserted (i.e., logic high) when the scaled output sense signal SOS 326 is less than the maximum frequency reference 354. When the maximum frequency signal MAX 335 is asserted, the request control 328 outputs a request signal REQ 336 with a request frequency substantially equal to the maximum switching frequency $f_{MAX}$ of the power switch.

FIGS. 4A-4B illustrate state tables 400 and 401 of example relationships between the switching frequency/request frequency $f_{REQ}$ and the on-time $t_{ON}$ of the power switch. As mentioned above, the counter may be an N-bit counter and as such, the state machine may have $2^N$ number of states. In state table 400 shown in FIG. 4A, as the state/count of the state machine increases, the frequency request frequency $f_{REQ}$ and on-time $t_{ON}$ decrease. Or in other words, as the state/count of the state machine increases, the request period $T_{REQ}$ increases. For implementing state table 400, the VCO could translate the state signal into the request period $T_{REQ}$. In the state table 401 shown in FIG. 4B, as the state/count of the state machine increases, the frequency request frequency $f_{REQ}$ and on-time $t_{ON}$ increase. Or in other words, as the state/count of the state machine increases, the request period $T_{REQ}$ decreases. For implementing state table 401, the VCO could translate the state signal into the request frequency $f_{REQ}$.

Figure 5:
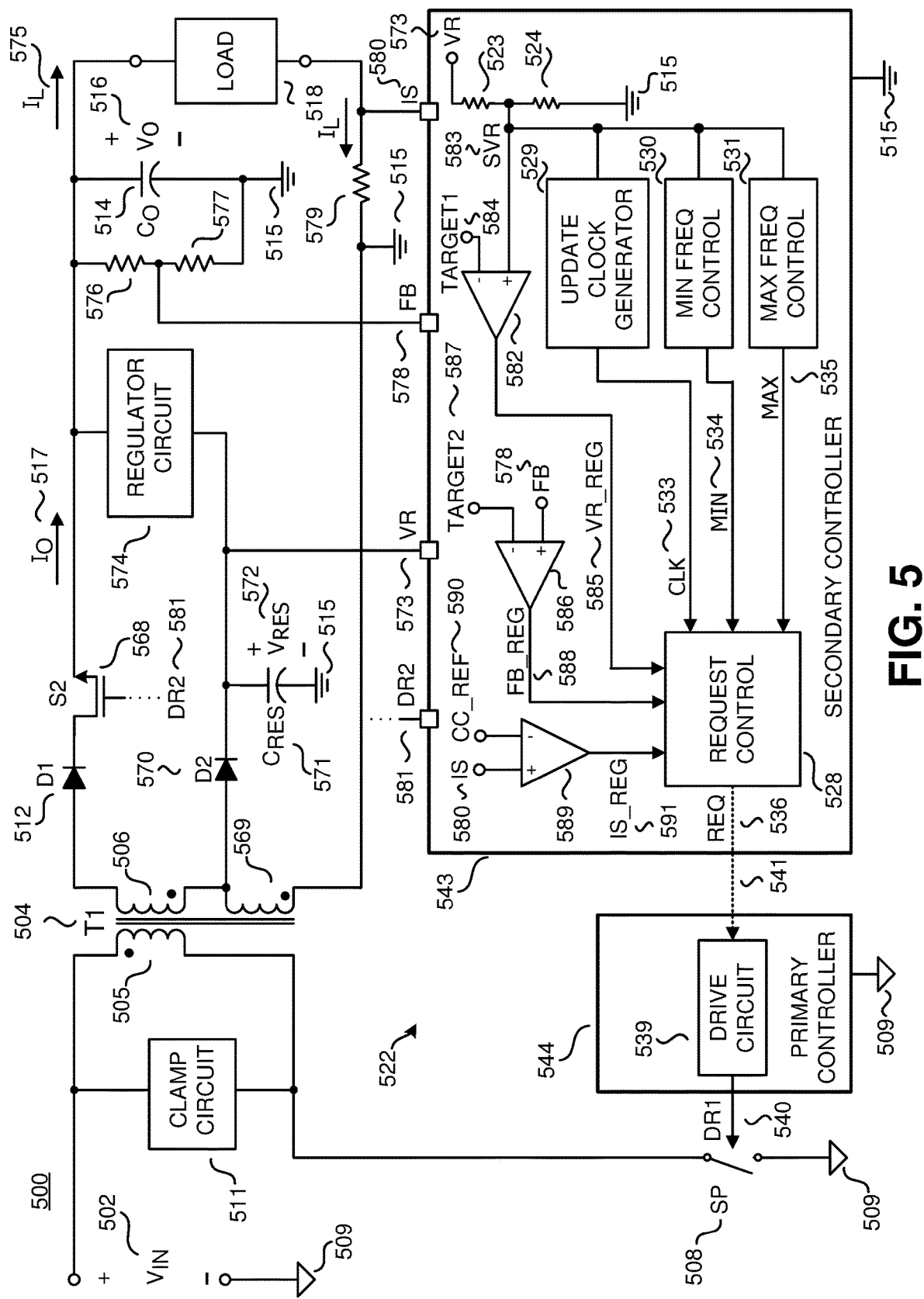
FIG. 5 is a schematic illustrating an example power converter and a primary controller and a secondary controller with variable update in accordance with embodiments of the present invention.

FIG. 5 illustrates another example switched mode power converter 500 that utilizes a secondary controller with an update clock generator 529. The power converter 500 shown in FIG. 5 shares many of the same elements as the power converters illustrated in FIGS. 1A-1B, and it should be understood that similarly named and numbered elements are coupled and function as discussed above. The controller 522 of power converter 500 includes a primary controller 544 and a secondary controller 543. At least one difference, however, is that the power converter 500 is a multi-output power converter including a first output and a second output, and the energy transfer element T1 504 has a first output winding 506 coupled to the first output and a second output winding 569 coupled to the second output of power converter 500. In addition, the power converter 500 further includes a regulator circuit 574 coupled between the multiple outputs of the power converter 500. The secondary controller 543 receives multiple output sense signals OS as described above. As will be further discussed, the feedback signal FB 578 representative of the output of the first output winding 506 may be an example of the output sense signal OS. Reservoir sense VR 573, representative of the output of the second output winding 569, may be another example of the output sense signal OS. Further, the primary controller 544 outputs a primary drive signal DR1 540 that controls the switching of the power switch SP 508 to control energy delivery from the primary side to the secondary side of the power converter 500. The secondary controller 543 outputs a secondary drive signal DR2 that controls the switching of a pass switch S2 568 to control energy delivery to the output capacitor 514.

Power converter 500 provides output power to the load 518 from an unregulated input voltage $V_{IN}$ 502, which in one example is a rectified ac line voltage or a rectified and filtered ac line voltage. The input voltage $V_{IN}$ 502 is coupled to be received by the energy transfer element 504. The example energy transfer element 504 shown in FIG. 5 includes three windings, an input winding 505, a first output winding 506, and a second output winding 569. Coupled across the input winding 505 is the clamp circuit 511, which limits the maximum voltage across a power switch SP 508 that is coupled to the primary winding 505 and an input return 509 as shown. Primary controller 544 includes the drive circuit 539 that provides drive signal DR1 540 to open and close power switch SP 508. Drive signal DR1 540 may be a voltage or current signal. Similar to what was discussed above, the drive circuit 539 turns on the power switch SP 508 in response to request events in the request signal REQ 536 from the secondary controller 543.

Output rectifier D1 512 is coupled to first output winding 506. A pass switch S2 568 is coupled to the output rectifier 512 and the output capacitor 514, and opens and closes in response to secondary drive signal DR2 581 from the secondary controller 543 to provide a regulated output voltage $V_O$ 516, output current $I_O$ 517, or a combination of the two to the load 518. In the example power converter 500, the output voltage 516 is positive with respect to an output return 515, which is galvanically isolated from the input return 509 by the energy transfer element T1 504. Secondary drive signal DR2 581 may be a voltage or a current signal. Resistors 576 and 577 are coupled in series across the output capacitor CO 514 and provide the feedback signal FB 578 to the secondary controller 543. As shown, the resistors 576 and 577 form a voltage divider for the output voltage $V_O$ 516. As such, the feedback signal FB 578 is representative of the output voltage $V_O$ 516, and specifically a scaled version of the output voltage $V_O$ 516.

Primary controller 544 and secondary controller 543 control the power switch SP 508 such that the input current of the power converter 500 is proportional to the input voltage $V_{IN}$ 502 by a factor that is substantially fixed throughout a half line period to maintain power factor. Further, the primary controller 544 and secondary controller 543 control the power switch SP 508 to regulate the output voltage $V_O$ 516, output current $I_O$ 517, or a combination of the two. As will be further discussed, the secondary controller 543 utilizes the feedback signal FB 578 and the reservoir sense VR 573 to determine when to switch the power switch SP 508. Further, secondary controller 543 may also utilize a current sense signal IS 580 representative of a load current IL 575 through load 518 to determine when to switch the power switch SP 508. Current sense resistor 579 may be coupled in series to the load 518 to provide the current sense signal IS 580.

When the instantaneous input power of the power converter 500 exceeds the demand of the load (plus some loss), the secondary controller 543 switches the pass switch S2 568 off to prevent the output voltage $V_O$ 516 from exceeding its desired value. In one example, the secondary controller 543 compares the feedback signal FB 578 to an output voltage reference to determine when to turn on and turn off the pass switch S2 568. If the feedback signal FB 578 exceeds the output voltage reference, the secondary controller 543 may output the secondary drive signal DR2 581 to control the pass switch S2 568 off. If the feedback signal FB 578 is less than the output voltage reference, the pass switch S2 568 is controlled on. When pass switch S2 568 on first output winding 506 is open (i.e., off), surplus energy from the output produces a current in the second output winding 569 and second output rectifier D2 570 to store the surplus energy in reservoir capacitor CRES 571. As shown, the output rectifier D2 570 and reservoir capacitor CRES 571 are coupled across the second output winding 569. The reservoir voltage VRES 572 is the voltage across reservoir capacitor CRES 571 and is referenced to the output return 515. The secondary controller 542 receives a reservoir sense signal VR 573, which is representative of the reservoir voltage VRES 572. In other examples, output rectifier D2 570 may be a switch driven by secondary controller 543.

Regulator circuit 574 is coupled between the reservoir capacitor CRES 571 and the output capacitor CO 514. Regulator circuit 574 may be a non-isolated power converter, such as a boost or buck-boost converter. A buck converter could also be used for regulator circuit 574. For that example, the second output winding 569 would be coupled to output capacitor CO 514 to provide output voltage $V_O$ 516 and output current $I_O$ 517 while the first output winding 506 is coupled to reservoir capacitor CRES 571 to provide reservoir voltage VRES 572. When the instantaneous input power is less than the demand of the load 518 plus the loss in the power conversion circuits, regulator circuit 574 receives current from the reservoir capacitor CRES 571 to supplement the energy delivered to the load 518. In one example, the reservoir voltage VRES 572 increases when the energy transfer element T1 504 is delivering more energy to the output of the power converter (i.e., load 518) than needed. The reservoir voltage VRES 572 is substantially constant when the energy transfer element T1 504 is delivering the energy needed to the output of the power converter and the reservoir voltage VRES 572 decreases when the energy transfer element T1 504 is not delivering the energy needed. In other words, the reservoir voltage VRES 572 decreases when the regulator circuit 574 is pulling current from the reservoir capacitor CRES 571. As such, the reservoir sense signal VR 573 representative of the reservoir voltage VRES 572 is also representative of the amount of energy delivered to output of the power converter 500 and considered an output sense signal OS as discussed above.

Secondary controller 542 is shown as receiving the reservoir sense signal VR 573, feedback signal FB 578, and current sense signal IS 580. The secondary controller 542 outputs the secondary drive signal DR2 581 and may also output a control signal for the regulator circuit 574 (not shown). Secondary controller 542 is similar to the secondary controller shown in FIG. 1B and the controller shown in FIG. 1A and it should be appreciated that similarly named and numbered elements are coupled and function as described above. The secondary controller 543 is shown as including resistors 523 and 524, comparators 582, 586, and 589, request control 528, update clock generator 529, minimum frequency control 530, and maximum frequency control 531.

Similar to as discussed above, resistors 523 and 524 are coupled together as a voltage divider for the received reservoir sense signal VR 572 (which is one example of output sense signal OS) and referenced to output return 515. The divided value of the reservoir sense signal VR 572 is shown as scaled reservoir sense signal SVR 583. Comparator 582 is coupled to receive the scaled reservoir sense signal SVR 583 and the first target value TARGET1 584. As shown, the scaled reservoir sense signal SVR 583 is received at the non-inverting input of comparator 582 while the first target value TARGET1 584 is received at the inverting input. Comparator 586 is coupled to receive the feedback signal FB 578 and the second target value TARGET2 587. As shown, the feedback signal FB 578 is received at the non-inverting input of comparator 586 while the second target value TARGET2 587 is received at the inverting input. Comparator 589 is coupled to receive the current sense signal IS 580 and the current reference CC_REF 590. As shown, the current sense signal IS 580 is received at the non-inverting input of comparator 586 while the current reference CC_REF 590 is received at the inverting input.

In one example, primary and secondary controllers 544 and 543 may operate in a constant voltage region, constant current region, and/or a constant power region. Constant voltage generally refers to regulating the output voltage $V_O$ 516 to a constant value while constant current refers to regulating the output current $I_O$ 517 to a constant, and similarly for constant power. Further, the primary and secondary controllers 544 may also provide dimming for the load 518. The feedback signal FB 578 and the reservoir sense VR 573 may be utilized for constant voltage operation while the current sense IS 580 and the reservoir sense VR 573 may be used for constant current operation. For dimming, the current sense IS 580 and the reservoir sense VR 573 may be used. In one example, current reference CC_REF 590 may be representative as the threshold for the secondary controller 543 to operate in constant current operation.

Request control 528 is coupled to receive the output of comparators 585, 586, and 589, which are referred to as the reservoir regulation signal VR_REG 585, feedback regulation signal FB_REG 588, and the current regulation signal IS_REG 591. The request control 528 outputs the request signal REQ 536, which may include request events that are generated in response to at least one of the reservoir regulation signal VR_REG 585, feedback regulation signal FB_REG 588, and the current regulation signal IS_REG 591 and indicates that the controller 539 should turn on the power switch SP 508. The request signal REQ 542 may be a rectangular pulse waveform that pulses to a logic high value and quickly returns to a logic low value and the logic high pulses may be referred to as request events. The time between leading edges or trailing edges of the request events may be referred to as the request period $T_{REQ}$ and the request frequency $f_{REQ}$ is the reciprocal of the request period $T_{REQ}$. The request frequency $f_{REQ}$ (and the subsequent switching frequency of the power switch SP 508) may be responsive to the reservoir sense signal VR 573 (via reservoir regulation signal VR_REG 585). The request frequency $f_{REQ}$ may also be responsive to the feedback signal FB 578 (via the feedback regulation signal FB_REG 588) or the current sense signal IS 580 (via the current regulation signal IS_REG 591).

In one example, the request frequency $f_{REQ}$ decreases if the scaled reservoir sense signal SVR 583 is greater than the first target value TARGET1 584 (i.e., the reservoir regulation signal VR_REG 585 is logic high or asserted) and increases if the scaled reservoir sense signal SVR 583 is less than the first target value TARGET1 584 (i.e., the reservoir regulation signal VR_REG 585 is logic low or deasserted). In another example, the request frequency $f_{REQ}$ decreases if the current sense signal IS 580 is greater than the current reference CC_REG 590 (i.e., current regulation signal IS_REG 591 is logic high or asserted).

As will be further discussed, the speed at which the request control 528 updates the request frequency $f_{REQ}$ of the request signal REQ 536 is responsive to the frequency of the clock signal CLK 533 of the update clock generator 529. The update clock generator 529 determines the frequency of the clock signal CLK 533 in response to the reservoir sense signal VR 573 via the scaled reservoir sense signal SVR 583. However, it should be appreciated that the update clock generator 529 could determine the frequency of the clock signal CLK 533 in response to the feedback single 578 or a scaled version of the feedback signal FB 578.

Drive circuit 539 is coupled to receive the request signal REQ 536 through a communication link 541. In the example shown, the drive circuit 539 is coupled to turn on the power switch SP 508 in response to the request events in the request signal REQ 536. In particular, the drive circuit 539 is coupled to generate the drive signal DR1 540 in response to the request events. For example, the drive circuit 539 may transition the drive signal DR1 540 to a logic high value (to turn on power switch SP 508) in response to a received enable event. The frequency of the request signal REQ 536 is substantially equal to the switching frequency of the power switch SP 508. Further, the request frequency $f_{REQ}$ may determine the on-time of the power switch SP 508.

Update clock generator 529, minimum frequency control 530, and the maximum frequency control 531 are coupled to receive the scaled reservoir sense signal SVR 583. The update clock generator 529 outputs the clock signal CLK 533 in response to the scaled reservoir sense signal SVR 583. The clock signal CLK 533 may be a rectangular pulse waveform which pulses to a logic high value and quickly returns to a logic low value. Update clock generator 529 varies the frequency of the clock signal CLK 533 in response to the value of the scaled reservoir sense signal SVR 583. As will be discussed, if the scaled reservoir sense signal SVR 583 is less than an upper fast update reference and greater than a lower fast update reference, the update clock generator 529 outputs a clock signal CLK 533 with a first clock frequency $f_1$, or $f_{CLK}=f_1$. The first clock frequency $f_1$ may be selected to be slow enough to regulate the output of the power converter 500 without compromising PFC. In one example, the first clock frequency $f_1$ may be substantially equal to 10 kilohertz (kHz). However, if the scaled reservoir sense signal SVR 583 is greater than the upper fast update reference or less than the lower fast update reference, the update clock generator 529 outputs the clock signal CLK 533 with a second clock frequency $f_2$ ($f_{CLK}=f_2$) that is greater (i.e., faster) than the first clock frequency $f_1$. In one example, the second clock frequency $f_2$ is M times greater than the first clock frequency $f_1$, or mathematically: $f_2=M*f_1$. For example, the second clock frequency $f_2$ may be five times greater than the first clock frequency $f_1$. Further, the second clock frequency $f_2$ may be substantially equal to 50 kHz. The update clock generator 529 may increase the frequency of the clock signal CLK 533 to address transient conditions, such as a change in the input voltage $V_{IN}$ 502 or the load 518. If the scaled reservoir sense signal SVR 583 is greater than the upper fast update reference or less than the lower fast update reference, this may indicate there is a transient condition that the secondary controller 543 should address. In other words, the power converter 500 may be over delivering energy or under delivering energy more than expected. During this quick response mode, PFC may be compromised but the secondary controller 543 may bring the output back into regulation quicker. The example shown in FIG. 5 utilizes the scaled reservoir sense signal SVR 583, however, the update clock generator 529 could utilize the feedback signal FB 578 or a scaled version of the feedback signal FB 578 to determine the frequency of the CLK signal 533.

The request control 528 receives the clock signal CLK 533 and updates/determines the operational state of the power switch SP 508 in response to at least one of the reservoir regulation signal VR_REG 585, feedback regulation signal FB_REG 588, or current regulation signal IS_REG 591 at a speed determined by the frequency of the clock signal CLK 533. In other words, the request control 528 determines the request frequency $f_{REQ}$ and period $T_{REQ}$ of the request signal REQ 536 at a speed determined by the frequency of the clock signal CLK 533. As discussed above, the request frequency $f_{REQ}$ and period $T_{REQ}$ of the request signal REQ 536 may set the switching frequency/period and the on-time of the power switch SP 508. For example, if the frequency of the clock signal CLK 533 is 10 kHz, the request control 128 would update the operational state every 100 microseconds (μs).

Minimum frequency control 530 outputs the minimum frequency signal MIN 534 in response to the reservoir sense signal VR 573 (via the scaled reservoir sense signal SVR 583). The minimum frequency signal MIN 534 may be a rectangular waveform with varying durations of logic high and logic low sections. The minimum frequency control 530 indicates to the request control 528 via the minimum frequency signal MIN 532 that the request control 528 and the controller 522 should be operating at a minimum frequency. If the scaled reservoir sense signal SVR 583 is greater than a minimum frequency reference, this may be an indication that the power converter 500 is over delivering energy to the point that the primary and secondary controllers 544 and 543 should take swift action to reduce the energy delivered. In operation, if the scaled reservoir sense signal SVR 583 is greater than the minimum frequency reference by more than a third threshold (i.e., minimum frequency reference), the minimum frequency control 530 asserts the minimum frequency signal MIN 534. In one example, a logic high value for the minimum frequency signal MIN 534 may correspond to an asserted minimum frequency signal MIN 534. The example shown in FIG. 5 utilizes the scaled reservoir sense signal SVR 583, however, the minimum frequency control 530 could utilize the feedback signal FB 578 or a scaled version of the feedback signal FB 578 to determine if the minimum frequency signal MIN 534 should be asserted.

The request control 528 is coupled to receive the minimum frequency signal MIN 534. In response to an asserted minimum frequency signal MIN 534, the request control 528 outputs the request signal REQ 536 where the request frequency $f_{REQ}$ of the request signal REQ 536 is at a minimum value set by the secondary controller 543 (i.e. the request period $T_{REQ}$ is at a maximum value). As such, the switching frequency of the power switch SP 508 is set to a minimum value and energy delivered by the power converter 500 is reduced.

Similarly, maximum frequency control 531 outputs the maximum frequency signal MAX 535 in response to the reservoir sense signal VR 573 (via the scaled reservoir sense signal SVR 583). The maximum frequency signal MAX 535 may be a rectangular waveform with varying durations of logic high and logic low sections. The maximum frequency control 531 indicates to the request control 528 via the maximum frequency signal MAX 535 that the power converter should be operating at a maximum frequency. If the scaled reservoir sense signal SVR 583 is less than a maximum frequency reference, this may be an indication that the power converter 500 is under delivering energy to the point that the primary and secondary controller 544, 543 should take swift action to increase the energy delivery. In operation, if the scaled reservoir sense signal SVR 583 is less than the maximum frequency reference, the maximum frequency control 531 asserts the maximum frequency signal MAX 535. In one example, a logic high value may correspond to an asserted maximum frequency signal MAX 535. The example shown in FIG. 5 utilizes the scaled reservoir sense signal SVR 583, however, the maximum frequency control 531 could utilize the feedback signal FB 578 or a scaled version of the feedback signal FB 578 to determine if the maximum frequency signal MAX 535 should be asserted.

The request control 528 is coupled to receive the maximum frequency signal MAX 535. In response to an asserted maximum frequency signal MAX 535, the request control 528 outputs the request signal REQ 536 where the request frequency $f_{REQ}$ of the request signal REQ 536 is at a maximum set by the secondary controller 543 (i.e., the request period $T_{REQ}$ is at a minimum value). As such, the switching frequency of the power switch SP 508 is set to a maximum value and energy delivered by the power converter 500 is increased.

Figure 6:
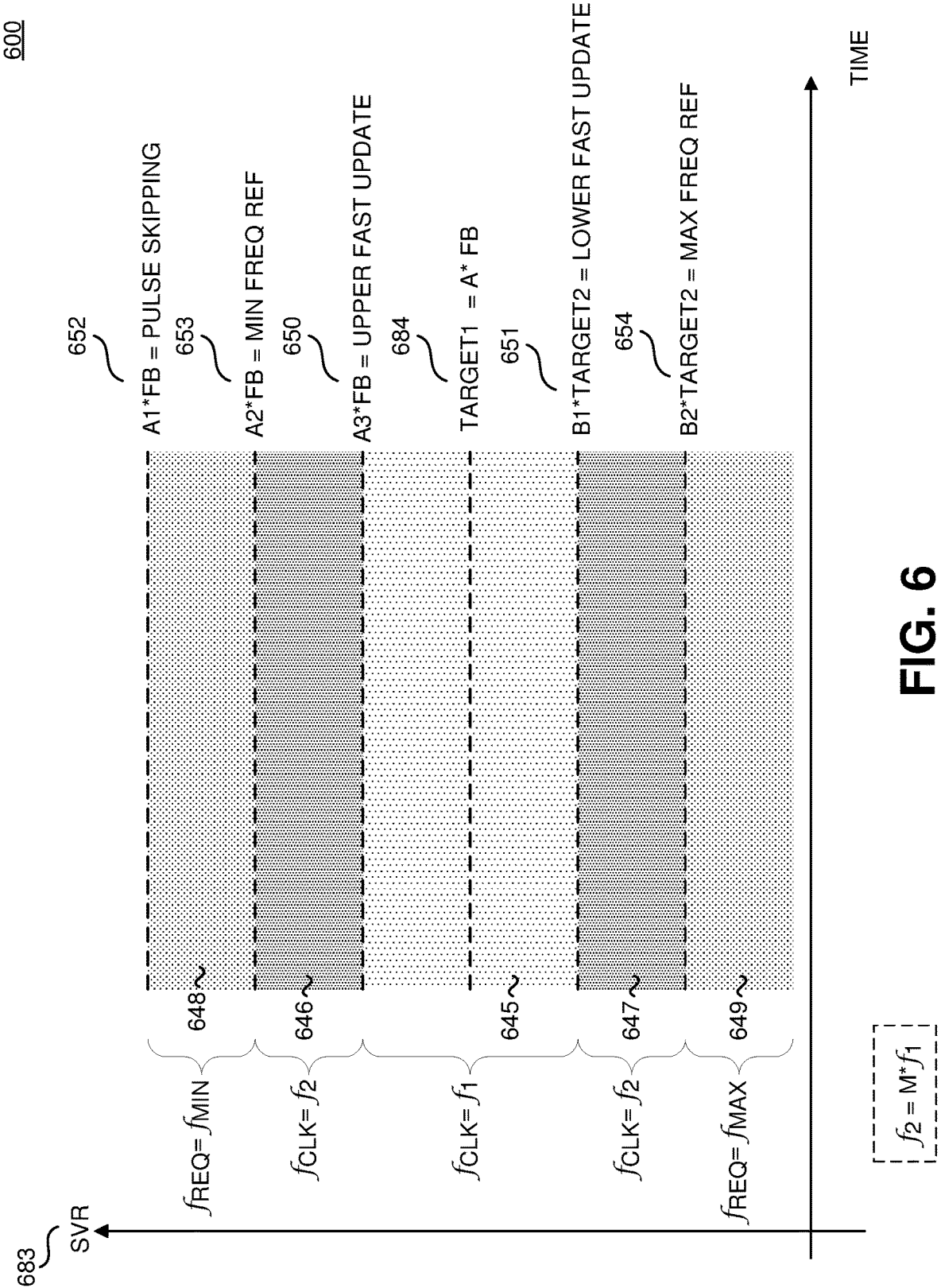
FIG. 6 is a timing diagram illustrating various operation bands for the update for the controller of FIG. 5, in accordance with embodiments of the present invention.

FIG. 6 illustrates a timing diagram 600 of various operation bands for the update clock generator 529, minimum frequency control 530, and maximum frequency control 531 shown in FIG. 5. It should be appreciated that similar named and numbered elements couple and function as described above. It is appreciated that FIG. 6 shares many similarities as the timing diagram 200 shown in FIG. 2. At least one difference, however, is that the y-axis is the scaled reservoir signal SVR 683. Further, the thresholds for the scaled reservoir signal SVR 683 are determined by the first target value TARGET1 684, the second target value TARGET2, and the feedback signal FB.

Region 645, which is the area shaded with loosely packed dots in FIG. 6, is representative of the normal frequency operating region of the power converter and primary and secondary controller. Within region 645, the primary and secondary controllers regulate the output of the power converter while maintaining PFC. Region 645 is banded by the upper fast update reference 650 and the lower fast update reference 651 with the first target value TARGET1 684 between the references. The first target value TARGET1 684 may be substantially equal to a product of constant A and the feedback signal FB (as shown in FIG. 5). In one example, the constant A may be 1.0-1.05. The upper fast update reference 650 may be substantially equal to the product of constant A3 and the feedback signal FB. In one example, constant A3 may be a value between 1 and 2, more specifically between 1 and 1.2. Further, constant A3 is greater than constant A (i.e., A<A3). In other words, the upper fast update reference 650 is some percentage between 0-100% greater than the first target value TARGET1 684, and more specifically between 0-20% greater. The lower fast update reference 651 may be substantially equal to the product of constant B1 and the second target value TARGET2 (as shown in FIG. 5). In one example, constant B1 may be a value between 0 and 1, and more specifically between 0.35 and 1. In other words, the lower fast update reference 651 is some percentage between 0-100% of the second target value TARGET2, and more specifically 35-100% of the second target value TARGET2. In other words, the lower fast update reference 651 is 0-65% less than the second target value TARGET2. In one example, the constants A3 and B1 may be trimmable by a user/designer. Further, the constants A3 and B1 may be selected in response to the expected output voltage $V_O$ of the power converter. In other words, constants A3 and B1 may be selected in response to the expected load voltage. Constants A3 and B1 may also be selected for the desired transient response of the secondary controller.

If the value for the scaled reservoir sense signal SVR 683 is between the lower fast update reference 651 and the upper fast update reference 650, the frequency of the clock signal CLK outputted by the update clock generator is set to the first clock frequency $f_1$, $f_{CLK}=f_1$. The first clock frequency $f_1$, may be selected to be a speed at which the power converter may regulate its output without adversely affecting PFC. In one example, the first clock frequency $f_1$ may be selected within a range of 1 kHz-10 kHz, and more specifically may be 10 kHz. Worded differently, if the scaled reservoir sense signal SVR 683 is within a percentage range of the first target value TARGET1 684 and the second target value TARGET2, determined by constants A3 and B1, the clock frequency fax is substantially the first clock frequency $f_1$.

Region 646 and 647, which are shaded with densely packed dots in FIG. 6, are representative of regions of faster frequency switching. These regions could correspond to transient conditions that affect the output of the power converter. As such, the controller increases how quickly it responds to the output to try to bring the power converter back into regulation faster than in region 645. In other words, the controller increases how quickly it responds to the output to bring the value of the scaled reservoir sense SVR 682 into region 645. Region 646 is banded by the upper fast update reference 650 and the minimum frequency reference 653 while region 647 is banded by the lower fast update reference 651 and the maximum frequency reference 654. The minimum frequency reference 653 is substantially equal to the product of constant A2 the feedback signal FB. The constant A2 may be a value between 1 and 2, and more specifically between 1.15 and 1.4. Further, constant A2 is greater than constant A3, which is greater than constant A (i.e., A<A3<A2). In other words, the minimum frequency reference 653 is some percentage between 0-100% greater than the frequency signal FB, and more specifically between 15-40% greater. The maximum frequency reference 654 is substantially equal to the product of constant B2 and the second target value TARGET2. Constant B2 may be a value between 0 and 1, and more specifically between 0.2 and 0.85. Further, constant B2 is less than constant B1 (i.e., B2<B1). Worded differently, maximum frequency reference 654 may be 15-80% less than the second target value TARGET2.

If the scaled reservoir sense SVR 683 is between the upper fast reference 650 and the minimum frequency reference 653, or is between the maximum frequency reference 654 and the lower fast update reference 651, the frequency of the clock signal CLK outputted by the update clock generator is set to the second clock frequency $f_2$, or $f_{CLK}=f_2$. The second clock frequency $f_2$ is greater (i.e., faster) than the first clock frequency $f_1$. In one example, the second clock frequency $f_2$ is M times greater than the first clock frequency $f_1$, or mathematically: $f_2=M*f_1$. For example, the second clock frequency $f_2$ may be five times greater than the first clock frequency $f_1$. Further, the second clock frequency $f_2$ may within 20 kHz-50 kHz, and more specifically, substantially equal to 50 kHz. In other words, if the scaled reservoir sense SVR 683 is greater than a percentage of the feedback signal FB determined by constant A3 but less than a percentage of the feedback signal FB determined by constant A2, the clock frequency fax is substantially equal to the second clock frequency $f_2$. Constants A2 and A3 may be trimmable values set by a user or designer. Further, they may be selected in response to the expected output voltage of the power converter or the expected load voltage. If the scaled reservoir sense SVR 683 is greater than a percentage of the second target value TARGET2 determined by constant B2 but less than a percentage of target value determined by constant B1, the clock frequency fax is substantially the second clock frequency $f_2$.

Region 648, which is shaded with moderately packed dots in FIG. 6, is representative of a region of minimum frequency switching. Region 648 is banded by a pulse skipping reference 652 and the minimum frequency reference 653. The minimum frequency reference 653 is substantially equal to the product of constant A2 and the feedback signal FB. The pulse skipping reference 652 is substantially equal to the product of constant A1 and the feedback signal FB. Constant A1 may be a value between 1 and 2, and more specifically between 1.2 and 1.5. Further, constant A1 is greater than constant A2, which is greater than constant A3, which is further greater than constant A (i.e., A<A3<A3<A1). In other words, pulse skipping reference 652 may be 20-50% greater than the feedback signal FB.

If the scaled reservoir sense SVR 683 is between the minimum frequency reference 653 and the pulse skipping reference 652, the minimum frequency signal MIN outputted by the minimum frequency control is asserted and the controller operates at minimum switching frequency $f_{MIN}$. Or in other words, the frequency of the request signal REQ is set to the minimum switching frequency $f_{MIN}$ of the power converter and controller, $f_{REQ}=f_{MIN}$. In other words, if the scaled reservoir sense SVR 683 is greater than a percentage of the feedback signal FB determined by constant A2 but less than a percentage of the feedback signal FB determined by constant A1, the request frequency $f_{REQ}$ is substantially the minimum switching frequency $f_{MIN}$. Further, if the scaled reservoir sense SVR 683 is greater than a percentage of the feedback signal FB determined by constant A1, the controller implements pulse skipping.

Region 649, which is shaded by moderately packed dots in FIG. 6, is representative of a region of maximum frequency switching. Region 649 is upper banded by the maximum frequency reference 654. If the scaled reservoir sense SVR 683 is less than the maximum frequency reference 654, the maximum frequency signal MAX outputted by the maximum frequency control is asserted and the controller operates at maximum switching frequency $f_{MAX}$. Or in other words, the frequency of the request signal REQ is set to the maximum switching frequency $f_{MAX}$ of the power converter and controller, $f_{REQ}=f_{MAX}$. In other words, the scaled reservoir sense SVR 683 is less than a percentage of the feedback signal FB determined by constant B2, the request frequency $f_{REQ}$ is substantially the maximum switching frequency $f_{MAX}$.

In one example, the second target value TARGET2 is a fixed value. As such, the lower fast update reference 651 and the maximum frequency reference 654 may also be fixed. This may be done because the reservoir voltage VR may be utilized as the supply voltage for the secondary controller and there is a minimum voltage requirement for the secondary controller to operate. The first target value TARGET1 684, upper fast update reference 650, minimum frequency reference 653, and pulse skipping reference 652 may not be fixed values as they are dependent on the value of the feedback signal FB. This may be done because the value of the output voltage (which the feedback signal FB is representative of) may vary with the load. For example, a dimmable lamp would decrease the output voltage as the lamp is dimmed.

Figure 7:
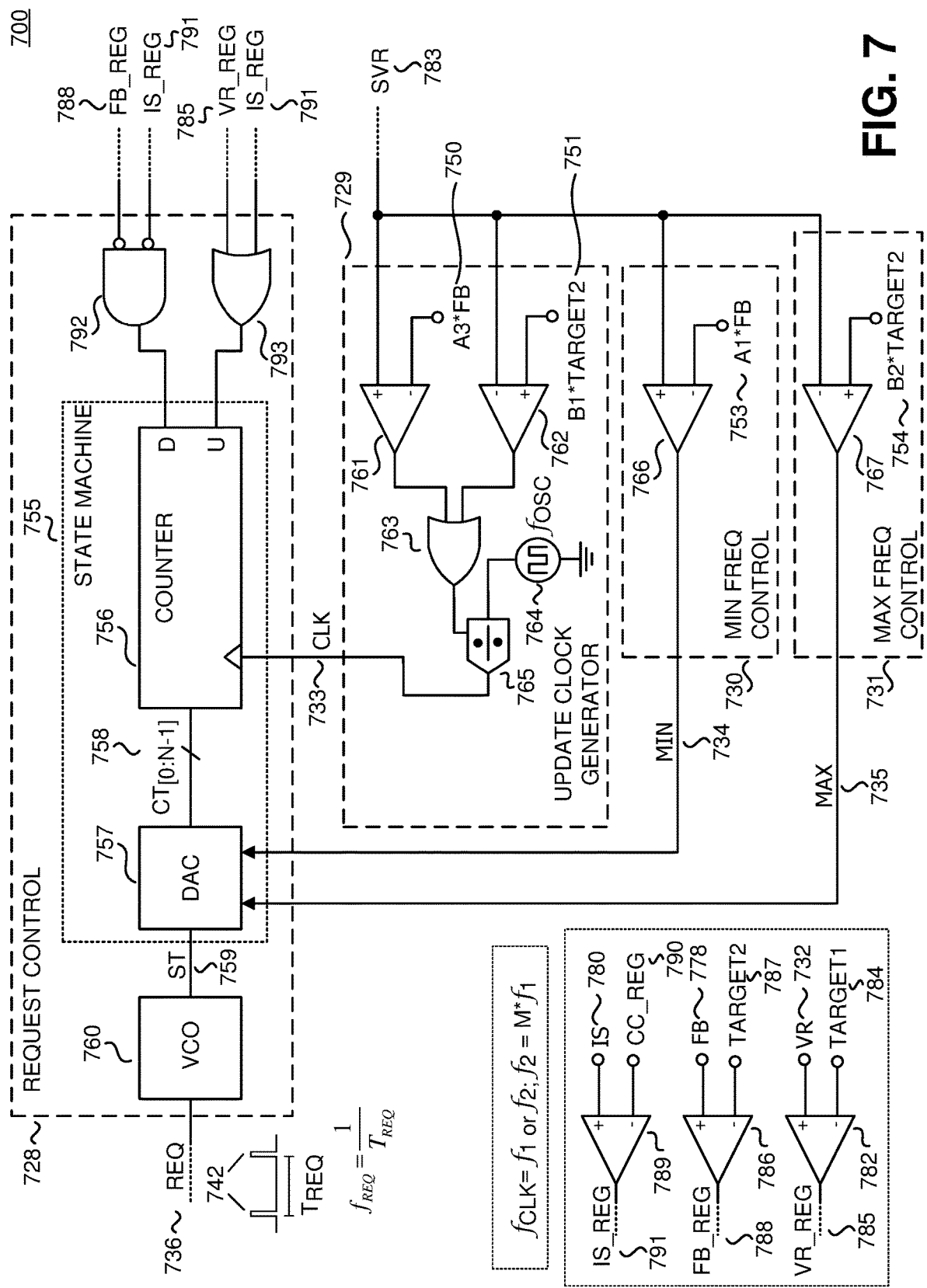
FIG. 7 is a schematic illustrating an example controller of FIG. 5, in accordance with embodiments of the present invention.

FIG. 7 illustrates elements of an example secondary controller 700, which may be one example of the secondary controller shown in FIG. 5. It should be appreciated that similarly named and numbered elements are coupled and function as described above. Further, the secondary controller 700 shown in FIG. 7 has been simplified for ease of explanation. For example, comparators 782, 786, and 789 are shown in the bottom left of the figure and labeled with their respective input and output signals. The voltage divider resistors have also been omitted for ease of explanation.

Request control 728 is coupled to receive the reservoir regulation signal VR_REG 785, feedback regulation signal FB_REG 788, and the current regulation signal IS_REG 791 from comparators 782, 786, and 789, respectively. As mentioned above, comparators 782, 786, and 789 compare reservoir sense VR 732, feedback signal FB 778, and the current sense IS 780 with their respective targets and/or references. The request control 728 is shown as including a state machine 755, voltage controlled oscillator (VCO) 760, AND gate 792, and OR gate 793. AND gate 792 is coupled to receive the inverted feedback regulation signal FB_REG 788 and the inverted current regulation signal IS_REG 791, as illustrated by the circles at the inputs of AND gate 792. OR gate 793 is coupled to receive the reservoir regulation VR_REG 785 and the current regulation IS_REG 791. The outputs of AND gate 792 and OR gate 793 are received by state machine 755. State machine 755 is further coupled to the signal CLK 733, the minimum signal MIN 734, and the maximum signal MAX 735. The state machine 755 outputs the state signal ST 759, which is representative of an operating state of the power converter, and more specifically, an operating state of the power switch. In one example, the state signal ST 759 is representative of the switching frequency and/or on-time of the power switch. State signal ST 759 may be an analog signal representative of a digital value. The state machine updates the state signal ST 759 in response to the reservoir regulation signal VR_REG 785, feedback regulation signal FB_REG 788, and the current regulation signal IS_REG 791. The speed at which the state machine 755 updates is responsive to the frequency of the clock signal CLK 733. In response to an asserted minimum signal MIN 734, the state machine 755 outputs a value for the state signal ST 759 which corresponds with the minimum switching frequency of the power converter. In response to an asserted maximum signal MAX 735, the state machine 755 outputs a value for the state signal ST 759 which corresponds with the maximum switching frequency of the power converter.

State machine 755 is shown as including a counter 756 and digital-to-analog converter (DAC) 757. Counter 756 is coupled to receive the output of the AND gate 792 at its down input (D), the output of OR gate 793 at its up input (U), and the clock signal CLK 733 at its clock input. The counter 756 outputs a count signal CT 758, which may be an N-bit digital signal. In operation, the counter 756 updates its internal count in response to the outputs of AND gate 792 and OR gate 793 at a speed indicated by the clock signal CLK 733. In one example, the counter 756 counts up in response to response to the reservoir regulation signal VR_REG 785 or the current regulation signal IS_REG 791, and the counter 756 counts down in response to the inverse of the regulation signal FB_REG 788 and the inverse of the current regulation signal IS_REG 791. In another example, it is appreciated that the logic of the up and down inputs of counter 756 may be switched depending on the desired response behavior of VCO 760.

DAC 757 is coupled to receive the count signal CT 758 and outputs the state signal ST 759. The DAC 756 further receives the minimum signal MIN 734 and the maximum signal MAX 735. In operation, the DAC 757 determines the value for the state signal ST 759 from the received digital count signal CT 758. In one example, the state signal ST 759 may be a voltage signal and the greater the count signal CT 758, the greater the voltage of the state signal ST 759. When the DAC 757 receives an asserted minimum signal MIN 734, the DAC 757 outputs a value for the state signal ST 759 which corresponds to the minimum switching frequency of the power switch (i.e., slowest switching frequency $f_{REQ}$). When the DAC 757 receives an asserted maximum signal MAX 735, the DAC 757 outputs a value for the state signal ST 759 which corresponds to the maximum switching frequency of the power switch (i.e., the fastest switching frequency $f_{REQ}$). In other words, when either minimum signal MIN 734 or the maximum signal MAX 735, the DAC 757 ignores the count signal CT 758. Once either the minimum signal MIN 734 or the maximum signal MAX 735 is deasserted, the DAC 757 returns to determining the value of the state signal ST 759 in response to the count signal CT 758.

The count signal CT 758 (i.e., internal count of the counter 756) and the state signal ST 759 are representative of an operating condition of the power switch. In one example, they may be representative of switching frequency (i.e., the request frequency $f_{REQ}$ of the request signal 736) and the on-time of the power switch.

The VCO 760 is coupled to receive the state signal ST 759 and outputs the request signal REQ 736. In one example, the request signal REQ 736 may be a rectangular pulse waveform that pulses to a logic high value and quickly returns to a logic low value. The logic high pulses may be referred to as request events 742. The time between leading edges of the request events 742 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 742 may be responsive to the value of the state signal ST 759.

For the example shown in FIG. 7, an increasing count signal CT 758 and state signal ST 759 corresponds to a decreasing switching frequency/request frequency $f_{REQ}$ of the request signal 736. Or in other words, an increasing count signal CT 758 and state signal ST 759 corresponds to an increasing switching period/request period $T_{REQ}$ of the request signal 736. As such, the VCO 760 increases the request period $T_{REQ}$ (i.e., decreases the request frequency $f_{REQ}$) with an increasing count signal CT 758. In other words, the VCO 760 functions with the request period $T_{REQ}$ at its input.

However, it should be appreciated that the output of the AND gate 792 could be received at the up input of the counter 756 and the output of the OR gate 793 could be received at the down input. For that example, an increasing count signal CT 758 (i.e., internal count of the counter 756) and the state signal ST 759 corresponds to an increasing switching frequency/the request frequency $f_{REQ}$ of the request signal 736. Or in other words, an increasing count signal CT 758 and state signal ST 759 corresponds to a decreasing switching period/request period $T_{REQ}$ of the request signal 736. As such, the VCO 760 increases the request frequency $f_{REQ}$ (i.e., decreases the request period $T_{REQ}$) with an increasing count signal CT 758. Worded differently, the VCO 760 functions with the request frequency $f_{REQ}$ at its input.

The update clock generator 729 includes comparators 761 and 762, OR gate 763, oscillator 764 with frequency $f_{OSC}$, and clock divider 765. Comparator 761 is coupled to receive the scaled reservoir sense SVR 783 and the upper fast update reference 750 (i.e., product of constant A3 and feedback signal FB 778). As shown, comparator 761 receives the scaled reservoir sense SVR 783 at its non-inverting input and the upper fast update reference 750 at its inverting input. Comparator 762 is coupled to receive the scaled reservoir sense SVR 783 and the lower fast update reference 751 (i.e., the product of constant B1 and second target value TARGET2). As shown, comparator 762 receives the scaled reservoir sense SVR 783 at its inverting input and the lower fast update reference 751 at its non-inverting input. OR gate 763 is coupled to receive the outputs of comparators 761 and 762.

Oscillator 764 generates a sequence of pulses with frequency $f_{OSC}$. In one example, the frequency of the oscillator is substantially 100 kHz, i.e., $f_{OSC}$=100 kHz. Clock divider 765 is shown as receiving the output of oscillator 764 and the output of the OR gate 763. The clock divider 765 divides the oscillator frequency $f_{OSC}$ by constant X or Y in response to the output of the OR gate 763. In one example, constant X may be 2 times constant Y, i.e., X=2Y. The output of the clock divider 765 is the clock signal CLK 733. In other words, the clock signal CLK 733 has a frequency that is a quotient of the oscillator frequency $f_{OSC}$ and either constant X or Y. The amount which the oscillator frequency $f_{OSC}$ is divided by may be determined by the value of the scaled reservoir sense SVR 783 via comparators 761 and 762.

In operation, the clock divider 765 divides the oscillator frequency $f_{OSC}$ by constant X if the output of OR gate 763 is logic low, corresponding to the value of the scaled reservoir sense SVR 783 being between the lower fast update reference 751 and the upper fast update reference 750. In other words, the clock divider 765 divides the oscillator frequency $f_{OSC}$ such that the frequency fax of the clock signal CLK 733 is substantially the first clock frequency $f_1$. Clock divider 765 divides the oscillator frequency $f_{OSC}$ by constant Y if the output of OR gate 763 is logic high, corresponding to the value of the scaled reservoir sense SVR 783 being greater than the upper fast update reference 750 or less than the lower fast update reference 751. In other words, the clock divider 765 divides oscillator frequency $f_{OSC}$ such that the frequency fax of the clock signal CLK 733 is substantially the second clock frequency $f_2$. For the example of a first clock frequency $f_1$ substantially equal to 5 kHz, a second clock frequency $f_2$ equal to 10 kHz, and an oscillator frequency $f_{OSC}$ equal to 100 kHz, the clock divider 765 divides the oscillator frequency $f_{OSC}$ by 20 (X) when the output of OR gate is logic low (i.e., the value of scaled reservoir sense SVR 783 is between the lower fast update reference 751 and the upper fast update reference 750) and the clock diver 765 divides the oscillator frequency $f_{OSC}$ by 10 (Y) when the output of OR gate is logic high (i.e., the value of the scaled reservoir sense SVR 783 is greater than the upper fast update reference 750 or less than the lower fast update reference 751).

Minimum frequency control 730 includes a comparator 766 that is coupled to receive scaled reservoir sense SVR 783 and the minimum frequency reference 753 (i.e., the product of constant A1 and feedback signal FB 778) and outputs the minimum frequency signal MIN 734. As shown, the comparator 766 receives the scaled reservoir sense SVR 783 at its non-inverting input and the minimum frequency reference 753 at its inverting input. In operation, the minimum frequency signal MIN 734 is asserted (i.e., logic high) when the scaled reservoir sense SVR 783 is greater than the minimum frequency reference 753. When the minimum frequency signal MIN 734 is asserted, the request control 728 outputs a request signal REQ 736 with a minimum request frequency $f_{REQ}$ (i.e., $F_{MIN}$) and the switching frequency of the power switch should also be at a minimum. For the example where an increasing count signal CT 758 and state signal 759 corresponds to a decreasing request frequency $f_{REQ}$, the DAC 757 outputs the maximum state for state signal 759 in response to an asserted minimum frequency signal MIN 734. For the example where an increasing count signal CT 758 and state signal 759 corresponds to an increasing request frequency $f_{REQ}$, the DAC 757 outputs the minimum state for the state signal 759 in response to an asserted minimum frequency signal MIN 734.

Maximum frequency control 731 includes a comparator 767 that is coupled to receive the scaled reservoir sense SVR 783 and the maximum frequency reference 754 (i.e., the product of constant B2 and second target value TARGET2 787) and outputs the maximum frequency signal MAX 735. As shown, the comparator 767 receives the scaled reservoir sense SVR 783 at its inverting input and the maximum frequency reference 754 at its non-inverting input. In operation, the maximum frequency signal MAX 735 is asserted (i.e., logic high) when the scaled reservoir sense SVR 783 is less than the maximum frequency reference 754. When the maximum frequency signal MAX 735 is asserted, the request control 728 outputs the request signal REQ 736 with a maximum request frequency $f_{REQ}$ (i.e., $f_{MAX}$) and the switching frequency of the power switch should also be at a maximum. For the example where an increasing count signal CT 758 and state signal 759 corresponds to a decreasing request frequency $f_{REQ}$, the DAC 757 outputs the minimum state for state signal 759 in response to an asserted maximum frequency signal MAX 735. For the example where an increasing count signal CT 758 and state signal 759 corresponds to an increasing request frequency $f_{REQ}$, the DAC 757 outputs the maximum state for the state signal 759 in response to an asserted maximum frequency signal MAX 735.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
   a comparator configured to compare a sense signal representative of an amount of energy delivered to an output of the power converter, to a target value;
   an update clock generator configured to receive the sense signal and to generate a clock signal having a clock frequency in response to the sense signal; and
   a request control coupled to the comparator and to the update clock generator, the request control configured to generate a request signal having a request frequency that is responsive to an output of the comparator and that controls an operational state of a power switch of the power converter, the request control further configured to update a rate at which the request frequency of the request signal is responsive to the clock frequency of the clock signal.

2. The controller of claim 1, wherein the clock frequency of the clock signal is a first frequency when the sense signal is between an upper reference and a lower reference.

3. The controller of claim 2, wherein the clock frequency of the clock signal is a second frequency when the sense signal is greater than the upper reference.

4. The controller of claim 2, wherein the clock frequency of the clock signal is a second frequency when the sense signal is less than the lower reference.

5. The controller of claim 2, wherein the upper reference is equal to a product of a first constant and the target value.

6. The controller of claim 2, wherein the lower reference is equal to a product of a second constant and the target value.

7. The controller of claim 1, wherein the target value is representative of a target output value for the output of the power converter.

8. The controller of claim 7, wherein the target value is constant.

9. The controller of claim 1, further comprising:
   a minimum frequency control configured to receive the sense signal and to generate a minimum frequency signal in response to the sense signal, the request control further configured to receive the minimum frequency signal and generate the request signal to have the request frequency substantially equal to a minimum switching frequency in response to an assertion of the minimum frequency signal.

10. The controller of claim 9, wherein the minimum frequency signal is asserted when the sense signal is greater than a minimum frequency reference, wherein the minimum frequency reference is a product of a minimum frequency reference constant and the target value.

11. The controller of claim 1, further comprising:
   a maximum frequency control configured to receive the sense signal and to generate a maximum frequency signal in response to the sense signal, the request control further configured to receive the maximum frequency signal and generate the request signal to have the request frequency substantially equal to a maximum switching frequency in response to an assertion of the maximum frequency signal.

12. The controller of claim 11, wherein the maximum frequency signal is asserted when the sense signal is less than a maximum frequency reference, wherein the maximum frequency reference is a product of a maximum frequency reference constant and the target value.

13. The controller of claim 1, wherein the request control comprises:
   a state machine configured to generate a state signal in response to the output of the comparator and the clock signal, wherein the state signal is updated at a rate responsive to the clock frequency of the clock signal; and
   an oscillator coupled to the state machine and configured to generate the request signal having the request frequency in response to the state signal.

14. The controller of claim 13, wherein the state machine comprises:
   a counter configured to generate a count signal in response to the output of the comparator and the clock signal, wherein the count signal is updated at the rate responsive to the clock frequency of the clock signal; and
   a digital-to-analog converter coupled to the counter and configured to generate the state signal in response to the count signal.

15. The controller of claim 14, wherein the digital-to-analog converter is further configured to generate the state signal in response to a minimum frequency signal and a maximum frequency signal, wherein the request frequency is substantially equal to a minimum frequency when the minimum frequency signal is asserted and the request frequency is substantially equal to a maximum frequency when the maximum frequency signal is asserted.

16. The controller of claim 1, wherein the controller further comprises a drive circuit coupled to generate a drive signal in response to request events in the request signal, wherein the drive signal is coupled to control switching of the power switch to control a transfer of energy from an input of the power converter to the output of the power converter.

17. The controller of claim 16, wherein the drive circuit is included in a primary controller included in the controller, and wherein the comparator, the request control, and the update clock generator are included in a secondary controller included in the controller.

18. The controller of claim 1, wherein the output of the power converter comprises a first output of the power converter, wherein the sense signal comprises a reservoir sense signal representative of a second output of the power converter to store surplus energy not delivered to the first output, and wherein the comparator comprises a first comparator of a plurality of comparators, wherein the controller further comprises:
   a second comparator of the plurality of comparators, the second comparator configured to compare a feedback signal representative of the first output of the power converter, to a second target value; and
   a third comparator of the plurality of comparators, the third comparator configured to compare a current sense signal representative of the first output of the power converter to a current reference, wherein the request control is further configured to generate the request signal having the request frequency in response to an output of the second comparator and an output of the third comparator to control the operational state of the power switch of the power converter.

19. The controller of claim 1, wherein the operational state of the power switch includes a switching frequency of the power switch.

20. The controller of claim 1, wherein the operational state of the power switch includes an on-time of the power switch.

21. A controller for use in a multi-output power converter with a first output, a second output, and a regulator circuit coupled between the first output and the second output, wherein the controller comprises:
   a first comparator configured to compare a reservoir sense signal representative of the second output to a first target value;
   a second comparator configured to compare a feedback signal representative of the first output to a second target value;
   an update clock generator configured to receive the reservoir sense signal and to generate a clock signal having a clock frequency in response to the reservoir sense signal; and
   a request control coupled to the first comparator, the second comparator and the update clock generator, the request control configured to generate a request signal having a request frequency in response to an output of the first comparator and an output of the second comparator, wherein the request frequency controls an operational state of a power switch of the multi-output power converter, and wherein a rate at which the request control updates the request frequency is responsive to the clock frequency of the clock signal.

22. The controller of claim 21, wherein the rate at which the request control updates the request frequency is the clock frequency.

23. The controller of claim 21, wherein the first target value is substantially a product of a constant and the feedback signal.

24. The controller of claim 21, wherein the clock frequency of the clock signal is a first frequency when the reservoir sense signal is between an upper reference and a lower reference.

25. The controller of claim 24, wherein the clock frequency of the clock signal is a second frequency when the reservoir sense signal is greater than the upper reference.

26. The controller of claim 25, wherein the upper reference is substantially equal to a product of a first constant and the feedback signal.

27. The controller of claim 24, wherein the clock frequency of the clock signal is a second frequency when the reservoir sense signal is less than the lower reference.

28. The controller of claim 27, wherein the lower reference is substantially equal to a product of a second constant and the second target value.

29. The controller of claim 21, further comprising:
   a minimum frequency control configured to receive the reservoir sense signal and to generate a minimum frequency signal in response to the reservoir sense signal, wherein the request control is configured to receive the minimum frequency signal and generate the request signal with the request frequency substantially equal to a minimum switching frequency in response to an assertion of the minimum frequency signal, wherein the minimum frequency signal is asserted when the reservoir sense signal is greater than a minimum frequency reference, wherein the minimum frequency reference is a product of a third constant and the feedback signal.

30. The controller of claim 21, further comprising:
   a maximum frequency control configured to receive the reservoir sense signal and to generate a maximum frequency signal in response to the reservoir sense signal, wherein the request control is configured to receive the maximum frequency signal and generate the request signal with the request frequency substantially equal to a maximum switching frequency in response to an assertion of the maximum frequency signal, wherein the maximum frequency signal is asserted when the sense signal is less than a maximum frequency reference, wherein the maximum frequency reference is a product of a fourth constant and the second target value.

31. The controller of claim 21, wherein the controller further comprises a drive circuit coupled to generate a drive signal in response to the request frequency of the request signal, wherein the drive signal is coupled to control switching of the power switch to control a transfer of energy from an input of the multi-output power converter to the first output and the second output of the multi-output power converter.

32. The controller of claim 31, wherein the drive circuit is included in a primary controller included in the controller, and wherein the first comparator, the second comparator, the request control, and the update clock generator are included in a secondary controller included in the controller, wherein the primary controller and the secondary controller are galvanically isolated.

33. The controller of claim 21, wherein the controller further comprises:
   a third comparator coupled to compare a current sense signal representative of the first output of the multi-output power converter to a current reference, wherein the request control is further configured to generate the request signal having the request frequency in response to an output of the third comparator to control the operational state of the power switch of the multi-output power converter.

34. The controller of claim 21, wherein the operational state of the power switch includes a switching frequency of the power switch.

35. The controller of claim 21, wherein the operational state of the power switch includes an on-time of the power switch.

* * * * *